(12) United States Patent
Swaminathan et al.

(10) Patent No.: US 10,650,245 B2
(45) Date of Patent: May 12, 2020

(54) GENERATING DIGITAL VIDEO SUMMARIES UTILIZING AESTHETICS, RELEVANCY, AND GENERATIVE NEURAL NETWORKS

(71) Applicant: Adobe Inc., San Jose, CA (US)

(72) Inventors: Viswanathan Swaminathan, Saratoga, CA (US); Hongxiang Gu, Los Angeles, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/004,170

(22) Filed: Jun. 8, 2018

(65) Prior Publication Data

US 2019/0377955 A1 Dec. 12, 2019

(51) Int. Cl.
*G06K 9/00* (2006.01)
*G11B 27/031* (2006.01)
*H04N 21/8549* (2011.01)
*G06N 3/00* (2006.01)
*H04N 21/854* (2011.01)
(Continued)

(52) U.S. Cl.
CPC ........ *G06K 9/00751* (2013.01); *G11B 27/031* (2013.01); *H04N 21/8549* (2013.01)

(58) Field of Classification Search
CPC ....... G11B 27/034; G11B 27/00; G11B 27/28; G06T 3/4053; G06T 5/00; G06T 2207/20084; G06T 2207/20021; H04N 21/4223; H04N 21/23418; H04N 5/91; H04N 19/42; H04N 5/262; H04N 5/23219; H04N 21/8549; H04N 21/454; H04N 19/61; H04N 21/44008; H04N 17/004; H04N 5/33; H04N 5/232; G06N 3/02;
(Continued)

(56) References Cited

U.S. PATENT DOCUMENTS 9,514,536 B2 12/2016 Rafati et al.
2010/0191722 A1* 7/2010 Boiman ............... G06K 9/4671
707/723
(Continued)

OTHER PUBLICATIONS

Yuli Gao, Tong Zhang, and Jun Xiao, "Thematic video thumbnail selection," in Image Processing (ICIP), 2009 16th IEEE International Conference on. IEEE, 2009, pp. 4333-4336.
(Continued)

*Primary Examiner* — Hung Q Dang
(74) *Attorney, Agent, or Firm* — Keller Jolley Preece

(57) ABSTRACT

The present disclosure relates to systems, methods, and non-transitory computer readable media for generating digital video summaries based on analyzing a digital video utilizing a relevancy neural network, an aesthetic neural network, and/or a generative neural network. For example, the disclosed systems can utilize an aesthetics neural network to determine aesthetics scores for frames of a digital video and a relevancy neural network to generate importance scores for frames of the digital video. Utilizing the aesthetic scores and relevancy scores, the disclosed systems can select a subset of frames and apply a generative reconstructor neural network to create a digital video reconstruction. By comparing the digital video reconstruction and the original digital video, the disclosed systems can accurately identify representative frames and flexibly generate a variety of different digital video summaries.

20 Claims, 13 Drawing Sheets

(51) Int. Cl.
 *H04N 21/234* (2011.01)
 *G06K 9/46* (2006.01)
 *G06K 9/62* (2006.01)
(58) Field of Classification Search
 CPC ........... G06K 9/00536; G06K 9/00718; G06K 9/00744; G10L 19/018
 See application file for complete search history.

(56) References Cited

U.S. PATENT DOCUMENTS

| | | | | |
|---|---|---|---|---|
| 2016/0012296 | A1* | 1/2016 | Xing | G06K 9/00765 386/241 |
| 2016/0232440 | A1* | 8/2016 | Gregor | G06N 3/0445 |
| 2017/0109584 | A1* | 4/2017 | Yao | G06K 9/00718 |
| 2017/0255831 | A1* | 9/2017 | Bernal | G06K 9/00751 |
| 2018/0061459 | A1* | 3/2018 | Song | G11B 27/34 |
| 2018/0232604 | A1* | 8/2018 | Seybold | G06K 9/6262 |

OTHER PUBLICATIONS

Wu Liu, Tao Mei, Yongdong Zhang, Cherry Che, and Jiebo Luo, "Multi-task deep visual-semantic embedding for video thumbnail selection," in Proceedings of the IEEE Conference on Computer Vision and Pattern Recognition, 2015, pp. 3707-3715.
Yale Song, Miriam Redi, Jordi Vallmitjana, and Alejandro Jaimes, "To click or not to click: Automatic selection of beautiful thumbnails from videos," in Proceedings of the 25th ACM International on Conference on Information and Knowledge Management. ACM, 2016, pp. 659-668.
Ke Zhang, Wei-Lun Chao, Fei Sha, and Kristen Grauman, "Video summarization with long short-term memory," in European Conference on Computer Vision. Springer, 2016, pp. 766-782.
Behrooz Mahasseni, Michael Lam, and Sinisa Todorovic, "Unsupervised video summarization with adversarial lstm networks," in Proc. IEEE Conf. Comput. Vis. Pattern Recognit, 2017, pp. 1-10.
Christian Szegedy, Vincent Vanhoucke, Sergey Ioffe, Jon Shlens, and Zbigniew Wojna, "Rethinking the inception architecture for computer vision," in Proceedings of the IEEE Conference on Computer Vision and Pattern Recognition, 2016, pp. 2818-2826.
Naila Murray, Luca Marchesotti, and Florent Perronnin, "Ava: A large-scale database for aesthetic visual analysis," in Computer Vision and Pattern Recognition (CVPR), 2012 IEEE Conference on. IEEE, 2012, pp. 2408-2415.
Xin Jin, Jingying Chi, Siwei Peng, Yulu Tian, Chaochen Ye, and Xiaodong Li, "Deep image aesthetics classification using inception modules and fine-tuning connected layer," in Wireless Communications & Signal Processing (WCSP), 2016 8th International Conference on. IEEE, 2016, pp. 1-6.
Nitish Srivastava, Elman Mansimov, and Ruslan Salakhudinov, "Unsupervised learning of video representations using lstms," in International Conference on Machine Learning, 2015, pp. 843-852.
MarcAurelio Ranzato, Arthur Szlam, Joan Bruna, Michael Mathieu, Ronan Collobert, and Sumit Chopra, "Video (language) modeling: a baseline for generative models of natural videos," arXiv preprint arXiv:1412.6604, 2014.
Junbo Zhao, Michael Mathieu, and Yann LeCun, "Energy-based generative adversarial network," arXiv preprint arXiv:1609.03126, 2016.
Michael Gygli, Helmut Grabner, Hayko Riemenschneider, and Luc Van Gool, "Creating summaries from user videos," in ECCV, 2014.
Sandra Eliza Fontes de Avila, Ana Paula Brando Lopes, Antonio da Luz Jr., and Arnaldo de Albuquerque Ara'jo, "Vsumm: A mechanism designed to produce static video summaries and a novel evaluation method," Pattern Recognition Letters, vol. 32, No. 1, pp. 56-68, 2011, Computer Vision and Pattern Recognition in Latin America.
Marco Furini, Filippo Geraci, Manuela Montangero, and Marco Pellegrini, "Stimo: Still and moving video storyboard for the web scenario," Multimedia Tools and Applications, vol. 46, No. 1, pp. 47, 2010.
Danila Potapov, Matthijs Douze, Zaid Harchaoui, and Cordelia Schmid, "Category-specific video summarization," in European conference on computer vision. Springer, 2014, pp. 540-555.
Hyun Sung Chang, Sanghoon Sull, and Sang Uk Lee. Efficient video indexing scheme for content-based retrieval. IEEE Transactions on Circuits and Systems for Video Technology, 9(8):1269-1279, 1999.
Eung Kwan Kang, Sung Joo Kim, and Joon Soo Choi. Video retrieval based on scene change detection in compressed streams. IEEE Transactions on Consumer Electronics, 45(3):932-936, 1999.
Hun-Cheol Lee and Seong-Dae Kim. Rate-driven key frame selection using temporal variation of visual content. Electronics Letters, 38(5):217-218, 2002.
Mundur, Padmavathi, Yong Rao, and Yelena Yesha. "Keyframe-based video summarization using Delaunay clustering." International Journal on Digital Libraries 6.2 (2006): 219-232.

* cited by examiner

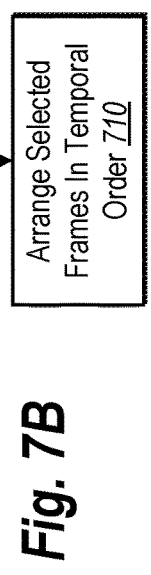
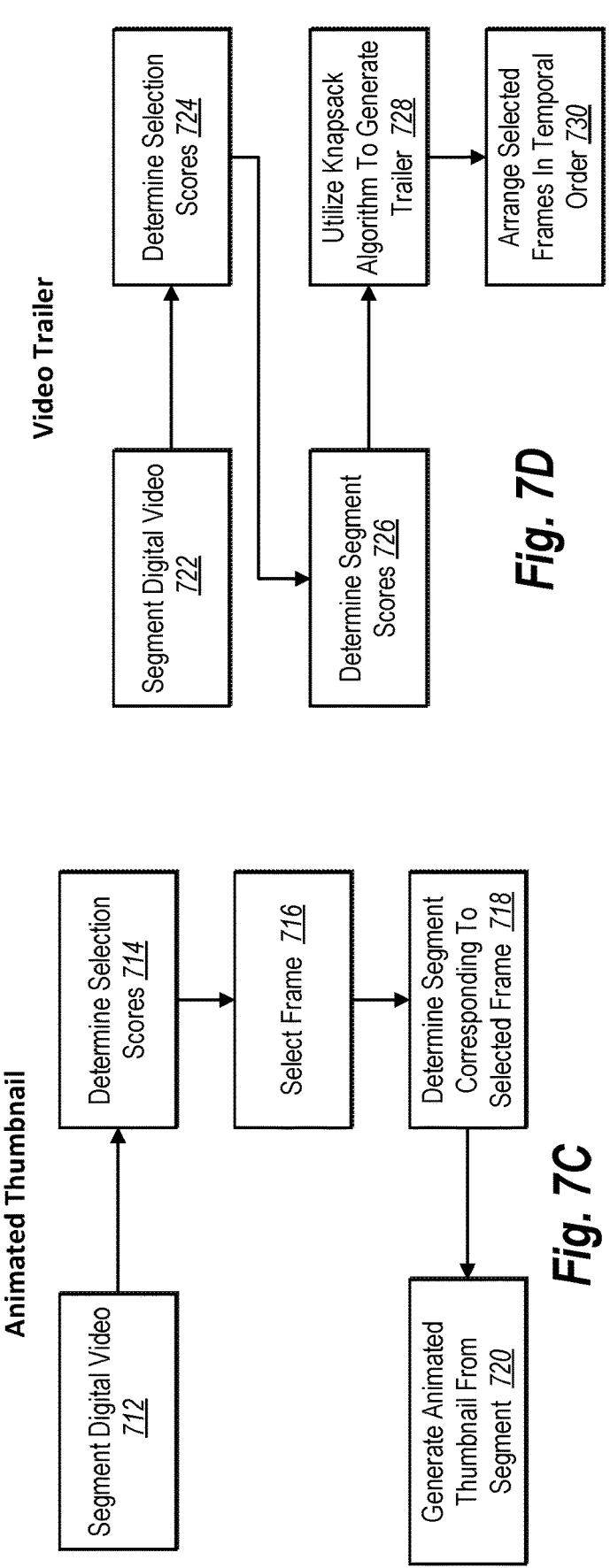

GENERATING DIGITAL VIDEO SUMMARIES UTILIZING AESTHETICS, RELEVANCY, AND GENERATIVE NEURAL NETWORKS

BACKGROUND

Advancements in computing devices and digital video analysis technology have led to a variety of innovations in providing digital media to users. For example, digital content systems are able to analyze a digital video and metadata associated with a digital video (e.g., title, uploader identity, creator, etc.) to select semantically representative frames to use as a thumbnail for the video. Additionally, some digital content systems are able to use various shallow metrics or clustering approaches to determine which frames to use as a thumbnail for the digital video.

Despite these advances however, conventional digital content systems continue to suffer from a number of disadvantages, particularly in the accuracy, efficiency, and flexibility of generating digital video summaries that are representative of a digital video as a whole. For instance, while some conventional digital content systems can identify frames of a digital video based on metadata or shallow metrics, these systems often generate thumbnails that do not accurately represent the overall digital video. For example, many conventional digital content systems rely on administrators or others to properly tag or otherwise associate digital video with metadata that the systems can analyze to generate a thumbnail. Because of their reliance on metadata to identify frames, these conventional product recommendation systems often generate inaccurate, ineffective thumbnails. Similarly, systems that use clustering approaches do not guarantee that an accurate representation will reside in a largest cluster, thus resulting in accurate results. Moreover, conventional systems often select representative frames that contain aesthetic defects (e.g., blurry, unfocused, or unclear images). Thumbnails based on such frames also fail to convey an accurate representation of the digital video.

In addition, conventional digital content systems are also inefficient. In particular, conventional digital content systems require significant time and computing resources to analyze digital videos and select a representative thumbnail. To illustrate, some conventional digital content systems utilize an adversarial neural network to directly determine representative thumbnails. However, this approach requires significant computer processing power and time to train and subsequently apply the adversarial neural network to target digital videos. Indeed, in some circumstances, adversarial networks may not converge, and when they do, the process can take hours. Furthermore, conventional digital content systems (such as adversarial neural networks) do not scale well in producing results for larger data sets.

Moreover, some conventional digital content systems are inflexible. For example, conventional digital systems are generally limited to generating a single type of representation (e.g., single-frame thumbnails). Accordingly, these systems rigidly generate a single summary format (such as a thumbnail) and require alternative architectures or systems to generate alternative formats (such as summary videos). In addition, conventional systems that require metadata to generate thumbnails cannot flexibly adapt to scenarios where metadata or particular data structures are unavailable.

Thus, there are several disadvantages with regard to conventional digital content systems.

SUMMARY

One or more embodiments described herein provide benefits and solve one or more of the foregoing or other problems in the art with systems, methods, and non-transitory computer readable media that accurately and flexibly generate digital video summaries utilizing a generative neural network, a relevancy neural network, and/or an aesthetics neural network. In particular, the disclosed systems can utilize a relevancy selector (neural network) and an aesthetics selector (neural network) to analyze a digital image and select a sparse subset of frames. Moreover, the disclosed systems can utilize a generative neural network (e.g., an LSTM-based autoencoder framework) to analyze the subset of frames and generate a digital video reconstruction. By comparing (e.g., minimizing loss between) the digital video reconstruction and the original digital video, the disclosed systems can identify representative frames that accurately reflect the digital video as a whole. The disclosed systems can utilize the representative frames to generate a variety of different (variable-length) digital video summary formats. For instance, utilizing this approach the disclosed systems can analyze a digital video and flexibly generate a digital video summary in the form of a thumbnail, a storyboard, an animated thumbnail, and/or a video trailer.

To illustrate, in one or more embodiments, the disclosed systems apply a convolutional neural network to a plurality of frames of a digital video to generate a set of deep features for the plurality of frames. Based on the set of deep features, the disclosed systems utilize a relevancy neural network and an aesthetics neural network to select one or more frames of the digital video. In addition, the systems identify a subset of deep features that correspond to the one or more selected frames and apply a generative reconstructor neural network to the subset of deep features to generate a digital video reconstruction. Furthermore, the disclosed systems generate a digital video summary from the selected frames of the digital video based on a comparison of the digital video reconstruction and the original digital video.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 7A-7D illustrate generating digital video summaries of varying formats in accordance with one or more embodiments;

DETAILED DESCRIPTION

Figure 1:
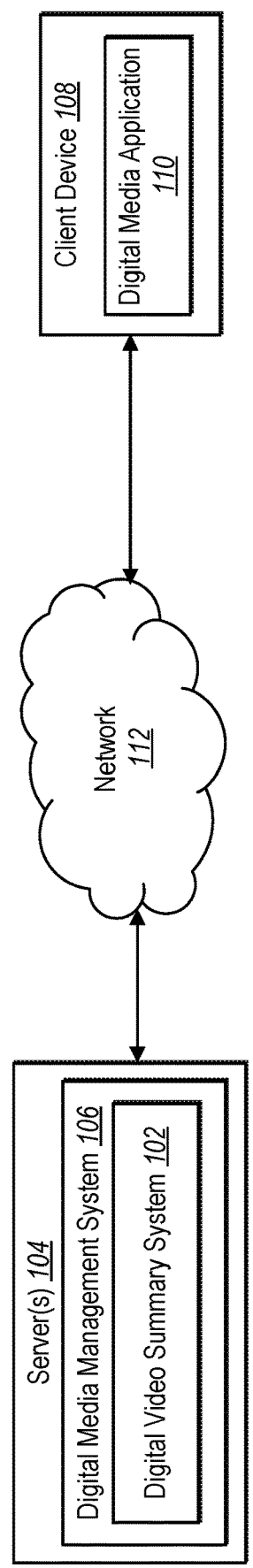
FIG. 1 illustrates an example environment for implementing a digital video summary system in accordance with one or more embodiments.

One or more embodiments of the present disclosure include a digital video summary system that utilizes a generative reconstructor neural network to accurately and flexibly generate digital video summaries that represent an input digital video in an unsupervised manner. Indeed, the digital video summary system can utilize an aesthetic neural network and a relevancy neural network to select a sparse subset of summarization frames from a digital video. Moreover, the digital video summary system can utilize a generative reconstructor neural network to create a digital video reconstruction from the summarization frames. In one or more embodiments, the digital video summary system utilizes a reconstruction loss function to compare the digital video reconstruction to the original digital video and identify representative frames that accurately reflect the original digital video. Utilizing this approach, the digital video summary system can generate a variety of digital video summaries. For instance, the digital video summary system can generate a digital video summary in the form of a thumbnail, a storyboard, an animated thumbnail, and/or a video trailer. Accordingly, the digital video summary system can provide an end-to-end, multi-purpose, and efficient video summarization model that utilizes a generative reconstructor to accurately, efficiently, and flexibly generate digital video summaries in a variety of formats.

For example, in one or more embodiments, the digital video summary system applies a convolutional neural network to a plurality of frames of a digital video to generate a set of deep features for the plurality of frames. Based on the set of deep features, the digital video summary system can utilize a relevancy neural network and an aesthetics neural network to select one or more frames of the digital video. In addition, the digital video summary system can identify a subset of deep features that correspond to the one or more selected frames and apply a generative reconstructor neural network to the subset of deep features to generate a digital video reconstruction. Furthermore, the digital video summary system can generate a digital video summary from the selected frames of the digital video based on a comparison of the digital video reconstruction and the original digital video.

As just mentioned, the digital video summary system can analyze a digital video utilizing a convolutional neural network to generate a set of deep features for a plurality of frames of the digital video. In some embodiments, the digital video summary system takes each frame of the digital video (or each frame at a particular sampling rate, such as 1 frame per second) as input for a convolutional neural network and utilizes the convolutional neural network to generate (or extract) deep features for each frame.

Based on the deep features, the digital video summary system can utilize one or more neural networks to select one or more frames of the digital video. To illustrate, the digital video summary system can utilize a relevancy neural network and an aesthetics neural network to select one or more frames of the digital video based on the generated set of deep features. For example, the digital video summary system can utilize the aesthetics neural network to take a frame of the digital video and generate an aesthetics score that indicates a visual appeal of the frame or an image quality of the frame. Similarly, the digital video summary system can also utilize a relevancy neural network to generate an importance score for the frame based on the deep features. In one or more embodiments, the digital video summary system combines the importance score from the relevancy neural network and the aesthetics score from the aesthetics neural network to generate a selection score for the frame. Moreover, the digital video summary system can select one or more frames of the digital video in accordance with the selection scores.

As mentioned above, the digital video summary system can further identify a subset of deep features that correspond to the selected frames of the digital video. Based on the identified subset of deep features, the digital video summary system can generate a digital video reconstruction to compare to the original digital video. More specifically, the digital video summary system can apply a generative reconstructor neural network to the subset of deep features corresponding to the one or more selected frames (and the selection scores corresponding to the one or more selected frames) to generate a digital video reconstruction. For instance, in one or more embodiments the digital video summary system utilizes a generative reconstructor neural network with an LSTM auto-encoder that utilizes the selection scores as an attention mechanism to analyze the deep features of the selected frames and generate a digital video reconstruction.

In addition, as mentioned above the digital video summary system can compare the digital video reconstruction with the original digital video. To compare the two, the digital video summary system can determine a measure of loss between the digital video reconstruction and the original digital video. For example, the digital video summary system can utilize a mean squared error loss function (or a variation thereof) to determine the measure of loss.

In one or more embodiments, the digital video summary system modifies internal neural network parameters to iteratively reduce (e.g., minimize) the loss between digital video reconstructions created by the generative reconstructor neural network and the original digital video. For example, the digital video summary can repeatedly utilize the relevancy neural network and the aesthetics neural network to select one or more frames of digital video, apply a generative reconstructor neural network to generate a digital video reconstruction, and determine a reconstruction loss for the digital video reconstruction. By repeating this process, the digital video summary system can reduce the measure of loss and identify an accurate set of frames for generating a digital video summary. Indeed, if a sparse subset of the video frames can be reconstructed to a new video that has a minimum difference from the original video, then the selected subset is a representative selection.

As mentioned above, based on comparing the digital video reconstruction and the original digital video, the digital video summary system can generate a digital video summary from the one or more selected frames of the digital video. For example, the digital video summary system can generate a digital video in the form of one or more of a thumbnail, a storyboard, an animated thumbnail, or a video trailer. Indeed, based on determining that the measure of loss between the digital video reconstruction and the digital video satisfies a threshold loss, the digital video summary system can select the one or more frames to use as the digital video summary in accordance with the techniques mentioned above.

To generate a digital video in the form of a thumbnail, for example, the digital video summary system can identify and select a frame from among the plurality of frames of the digital video that corresponds to a highest selection score. In addition, for a storyboard, the digital video summary system can select more than one frame of a digital video. For instance, the digital video summary system can identify a number (e.g., 3, 5, 10) of frames whose selection scores satisfy a threshold. To create an animated thumbnail and/or a video trailer, the digital video summary system can divide the digital video into segments and utilize a knapsack algorithm to select a set of segments based on determined selection scores.

The digital video summary system provides several advantages over conventional systems. For example, the digital video summary system can improve the accuracy of digital video summaries over conventional systems. For instance, unlike conventional digital content systems, the digital video summary system can utilize an aesthetics neural network that factors in aesthetic considerations, thereby generating digital video summaries that are pertinent to the digital video as a whole and also visually appealing. Additionally, whereas conventional systems rely on metadata associated with digital content to generate a digital video summary, the digital video summary system can utilize a relevancy neural network, an aesthetics neural network, and a generative reconstructor neural network to generate accurate digital video summaries based on visual content of the digital video on a frame-by-frame basis.

The digital video summary system further improves efficiency and stability over conventional systems. To illustrate, the digital video summary system utilizes fewer computer resources and less processing power than conventional systems that rely on a purely adversarial network approach. In addition, the digital video summary system is faster than some conventional digital content systems—i.e., the digital video summary system generates digital video summaries more quickly. For example, conventional adversarial network systems require significant training time and resources. The digital video summary system can produce better results while saving 90% of training time in relation to such approaches. Moreover, the digital video summary system can further apply an aesthetic neural network and relevancy neural network in parallel to identify accurate frames in reduced time.

The digital video summary system also improves flexibility over conventional systems. To illustrate, the digital video summary system can intelligently analyze a digital video in an unsupervised fashion (e.g., without supervised training with ground truth digital videos, which can be difficult and expensive to produce). In addition, unlike conventional systems that are limited to generating digital video summaries in a single format (e.g., a thumbnail), the digital video summary system can flexibly generate digital video summaries in multiple formats, as mentioned above and described in greater detail below.

As illustrated by the foregoing discussion, the present disclosure utilizes a variety of terms to describe features and benefits of the digital video summary system. Additional detail is hereafter provided regarding the meaning of these terms as used in this disclosure. For example, as used herein, the term "digital video summary" refers to a subset of frames of a digital video. In particular, a digital video summary includes one or more frames of a digital video that are representative of the digital video. For example, a digital video summary can include a thumbnail, a storyboard, an animated thumbnail, or a video trailer.

As used herein, the term "thumbnail" refers to a digital video summary in the form of a single frame of a digital video. In particular, a thumbnail can include a single static image representation of a digital video. As also used herein, the term "storyboard" refers to a digital video summary in the form a plurality of still frames of a digital video. In particular, a storyboard can include individual (isolated) key frames of a digital video (e.g., still frame shots from different portions of a digital video). For example, a storyboard can refer to a subset of frames of a digital video displayed simultaneously (e.g., side-by-side) or else in a scrollable or click-through format.

As further used herein, the term "animated thumbnail" refers to a digital video summary in the form of a continuous (short) video clip. In particular, an animated thumbnail can include an animated series of frames selected within a selected segment of a digital video. To illustrate, an animated thumbnail can be playable to present an animated view of a number of frames of a digital video (e.g., a segment of a total duration of 2-3 seconds). In addition, the term "video trailer" refers to an animated series of frames selected from a digital video. In particular, a video trailer can refer to a plurality of segments of a digital video. For example, the digital video summary system can segment a digital video and can select a subset of segments to generate a video trailer that summarizes the digital video when viewed in sequence.

As mentioned, the digital video summary system can utilize neural networks to generate digital video summaries for a digital video. As used herein, the term "neural network" (or "artificial neural network") refers to an artificial machine-learning model that learns tasks by analyzing example data utilizing a plurality of layers that analyze features of the example data at different levels of abstraction. In particular, the term "neural network" can include a model of interconnected digital neurons that communicate and learn to approximate complex functions and generate outputs based on a plurality of inputs provided to the model. For example, a deep neural network can include an output layer such as a softmax layer with M hidden layers between the softmax layer and an input layer. Neural networks such as convolutional neural networks can model complex non-linear relationships by generating compositional models that represent data as layered compositions of information. To illustrate, in one or more embodiments the digital video summary system utilizes a convolutional neural network trained to generate sequences of deep features for frames of a digital video.

As also mentioned, as part of generating digital video summaries, the digital video summary system can utilize an aesthetics neural network to determine aesthetics scores for frames of a digital video. As used herein, the term "aesthetics neural network" refers to a neural network that generates aesthetics scores. In particular, an aesthetics neural network can refer to a convolutional neural network that rates or scores digital images (e.g., frames of a digital video) based on clarity, focus, and/or visual appeal. For example, as described in greater detail below, the digital video summary system can fine-tune fully-connected layers of an InceptionV3 network to use as an aesthetics neural network. In addition, the digital video summary system can train the aesthetics neural network based on a large-scale visual aesthetics dataset. As used herein, the term "aesthetics score" refers to a score that indicates a clarity, a focus, a visual appeal, or a beauty rating of a digital image or a video frame.

As also mentioned, the digital video summary system can utilize a relevancy neural network to select one or more frames of a digital video to use as a digital video summary. As used herein, the term "relevancy neural network" refers to a neural network that generates importance (or relevancy) scores. For instance, a relevancy neural network can include a convolutional neural network and/or a long short-term memory ("LSTM") network. In particular, a relevancy neural network can include a convolutional neural network that the digital video summary system utilizes to generate a sequence of deep features for frames of a digital video. As used herein, the term "deep feature" can refer to latent or hidden features of a frame or digital video analyzed within a neural network. To illustrate, deep features can include one or more feature vectors generated by one or more layers of a neural network to reflect a frame or digital video. Deep features can include, for example, characteristics of a digital frame at different levels of abstraction generated at various layers of a neural network. Deep features can contain non-linear characteristics of a frame or digital video that are uninterpretable to human viewers.

As just mentioned, in addition to a convolutional neural network, a relevancy neural network can include an LSTM network. In particular, as described in greater detail below, the LSTM network can aggregate deep features of frames generated by the convolutional neural network to generate importance scores for the frames. As used herein, the term "importance score" refers to a score or rating that indicates an importance or relevance of a frame with respect to the digital video as a whole.

Furthermore, the digital video summary system can generate selection scores based on aesthetics scores and importance scores. As used herein, the term "selection score" refers to a score or rating for selecting a frame from a digital video. In particular, the term selection score includes a rating that indicates how well a given frame represents a digital video based on aesthetic considerations as well as relevance considerations. In some embodiments, the digital video summary system can generate selections scores by generating a linear combination of aesthetics scores and importance scores. In other embodiments, the digital video summary system can generate discretized/binary selection scores, where a 0 indicates a frame that will not be selected and a 1 indicates a frame that will be selected.

As mentioned, the digital video summary system can further compare a digital video reconstruction with an original digital video as part of generating a digital video summary. As used herein, the term "digital video reconstruction" refers to a digital video (or representation of a digital video) generated based on a subset of frames from an original digital video. In particular, a digital video reconstruction can refer to a digital video generated from of a subset of summary frames from an original digital video. The term "digital video reconstruction" can include a variety of data structures or formats. For example, a digital video reconstruction can include a sequence of reconstructed frames. A digital video reconstruction can also refer to a set of features (such as a feature vector or other digital representation) that reflects a reconstruction of an original digital video.

The digital video summary system can utilize a generative reconstructor neural network to generate a digital video reconstruction to compare with the original digital video. As used herein, the term "generative reconstructor neural network" refers to one or more neural networks that generates a digital video reconstruction based on selected frames of an original digital video. For example, a generative reconstructor neural network can refer to an LSTM autoencoder which consists of a bidirectional LSTM encoder and a bidirectional LSTM decoder. In other embodiments, a generative reconstructor neural network can refer to a variational autoencoder and/or a generative adversarial network.

As mentioned above, the digital video summary system can further divide a digital video into digital video segments as part of generating digital video summaries. As used herein, the term "digital video segment" (or sometimes simply "segment") refers to a subset or portion of the whole digital video. In particular, a digital video segment can refer to a subset of frames from the set of all frames of a given digital video. For example, a digital video segment can refer to a sequentially-ordered series of frames that the digital video summary system generates based on a particular segmentation algorithm (e.g., Kernel Temporal Segmentation).

In addition, in one or more embodiments, the digital video summary system implements a knapsack algorithm to select segments of the digital video to use for generating a digital video summary. As used herein, the term "knapsack algorithm" refers to an algorithm or technique that generates a digital video summary adhering to length constraints while also maximizing a total selection score of selected frames. Indeed, a knapsack algorithm can refer to an algorithm for performing combinatorial optimization. For example, given a set of items (e.g., digital video segments), each with a respective length (e.g., temporal length or a number of frames) and value (e.g., selection score), the knapsack algorithm can determine the number of each segment to include in a digital video summary so that the total length is less than or equal to a given limit and the total value is as large as possible.

As mentioned, in some embodiments the digital video summary system trains one or neural networks based on training data. As used herein, the term "train" refers to utilizing information to tune or teach a neural network. The term "training" (used as an adjective or descriptor, such as "training digital frames" or "training digital video") refers to information or data utilized to tune or teach the neural network.

More detail regarding the digital video summary system will now be provided with reference to the figures. For example, FIG. 1 illustrates a schematic diagram of an example environment for implementing a digital video summary system 102 in accordance with one or more embodiments. An overview of the digital video summary system 102 is described in relation to FIG. 1. Thereafter, a more detailed description of the components and processes of the digital video summary system 102 is provided in relation to the subsequent figures.

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 11.

As shown in FIG. 1, the environment includes a client device 108 associated with a user 118. The client device 108 can be one of a variety of computing devices, including a smartphone, tablet, smart television, desktop computer, laptop computer, virtual reality device, augmented reality device, or other computing device as described in relation to FIG. 11. Although FIG. 1 illustrates a single client device 108, in some embodiments the environment can include multiple different user client devices, each associated with a different user.

As illustrated in FIG. 1, the environment includes the server(s) 104. The server(s) 104 may generate, store, receive, and transmit electronic data, such as digital video, digital images, metadata, etc. For example, the server(s) 104 may receive data from the client device 108 in the form of a digital video. In addition, the server(s) 104 can transmit data to the client device 108 to provide a digital video summary of the received digital video. For example, the server(s) 104 can communicate with the client device 108 to transmit and/or receive data via the network 112. In some embodiments, the server(s) 104 comprises a content server. The server(s) 104 can also comprise an application server, a communication server, a web-hosting server, a social networking server, or a digital content campaign server.

As shown in FIG. 1, the server(s) 104 also include the digital video summary system 102 as part of a digital media management system 106. The digital media management system 106 can communicate with the client device 108 to provide digital content such as digital video, digital images, or some other type of information. Indeed, the digital media management system 106 can refer to a digital content campaign system (e.g., a system for selecting and providing customized digital videos to client devices simultaneously accessing websites or other digital assets), a digital media editing system, and/or a digital media viewing system.

Although FIG. 1 depicts the digital video summary system 102 located on the server(s) 104, in some embodiments, the digital video summary system 102 may be implemented by (e.g., located entirely or in part) on one or more other components of the environment. For example, the digital video summary system 102 may be implemented by the client device 108.

Moreover, in one or more embodiments, the digital video summary system 102 is implemented on a third-party server. For example, in such embodiments, the server(s) 104 may be associated with a digital content publisher, and a third-party server can host the digital video summary system 102. Specifically, the third-party server can receive information regarding a user, provide identification information for the user from the third-party server to the digital content publisher by way of the server(s) 104, and the server(s) 104 can select and provide digital content for display to a client device (e.g., the client device 108) of a user.

As mentioned, the digital video summary system 102 may provide digital video summaries of digital videos to the client device 108. Indeed, the digital video summary system 102 can distribute (e.g., via the network 112) digital video summaries to the client device 108, one or more frames that the digital video summary system 102 identifies as representative of the digital video.

As illustrated in FIG. 1, the client device 108 includes a digital media application 110. The digital media application 110 may be a web application or a native application installed on the client device 108 (e.g., a mobile application, a desktop application, etc.). The digital media application 110 can interface with the digital video summary system 102 to provide digital video content and/or digital video summaries to the server(s) 104, and to present (e.g., display) digital content received from the server(s) 104. Indeed, the digital media application 110 can receive data from the digital video summary system 102 and can present, for display, a user interface as part of a webpage, a social networking feed, or an application interface that includes a generated digital video summary.

In some embodiments, though not illustrated in FIG. 1, the environment may have a different arrangement of components and/or may have a different number or set of components altogether. For example, the client device 108 may communicate directly with the digital video summary system 102, bypassing the network 112. Additionally, the digital video summary system 102 can include one or databases (e.g., a digital video database) housed on the server(s) 104 or elsewhere in the environment. Further, the digital video summary system 102 can include one or more machine learning models (e.g., neural networks), and the digital video summary system 102 be implemented in a variety of different ways across the server(s) 104, the network 112, and the client device 108.

Figure 2:
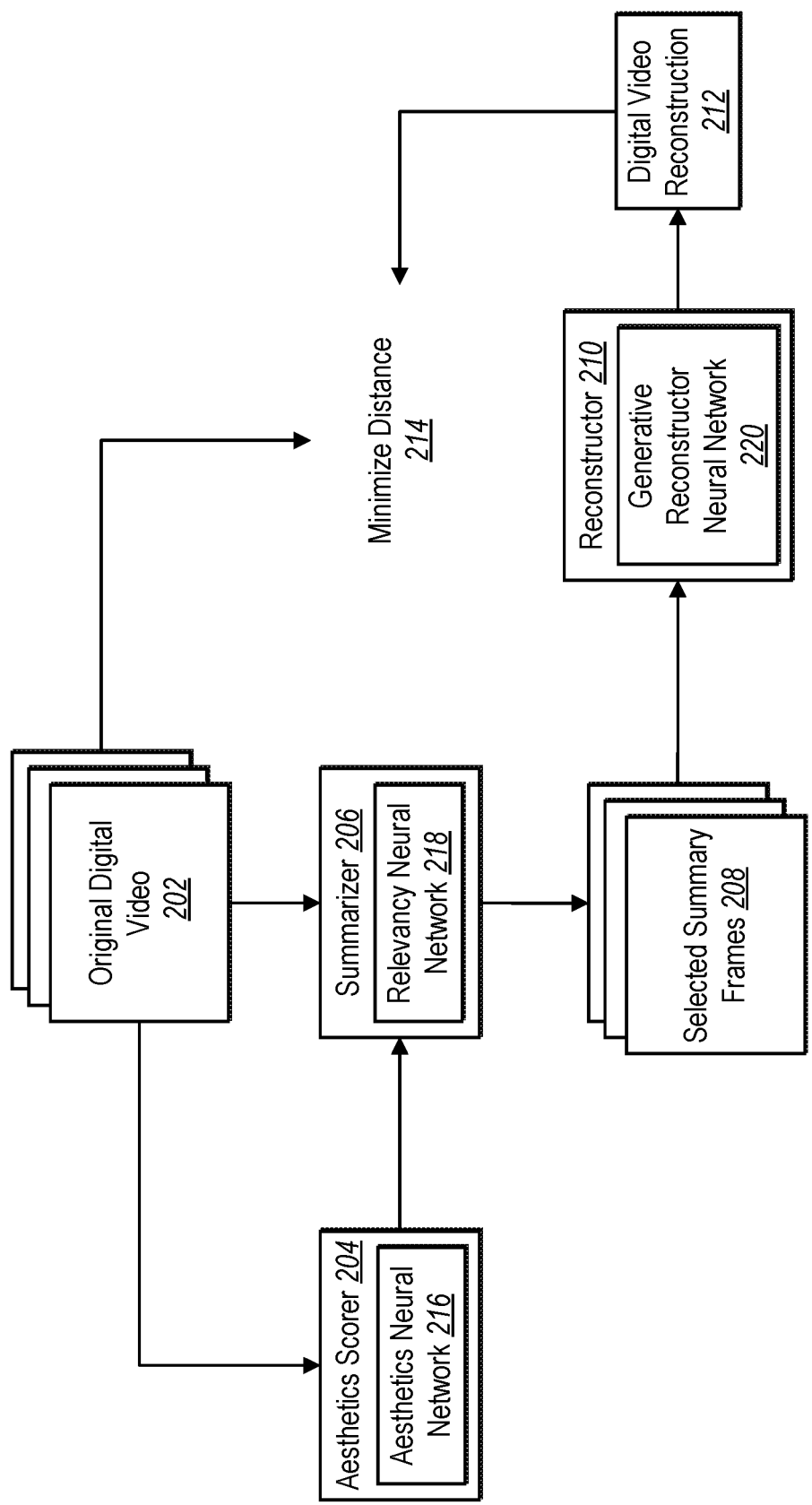
FIG. 2 illustrates generating a digital video summary in accordance with one or more embodiments.

As mentioned above, the digital video summary system 102 can generate a digital video summary for a digital video. FIG. 2 illustrates generating a digital video summary in accordance with one or more embodiments. Indeed, the following description of FIG. 2 provides an overview of generating a digital video summary by utilizing various neural networks and other techniques. Thereafter, a more detailed description of the specific components and techniques of the digital video summary system 102 is provided in relation to subsequent figures.

As illustrated in FIG. 2, the digital video summary system 102 analyzes an original digital video 202 that includes one or more frames. For example, the original digital video 202 can include a number of frames per second of real-time footage (e.g., 30 frames per second, 60 frames per second, or 120 frames per second). As shown, to analyze the digital video 202, the digital video summary system 102 utilizes an aesthetics scorer 204 (e.g., that includes an aesthetics neural network 216) and a summarizer 206 (e.g., that includes a relevancy neural network 218) in relation to one or more frames of the original digital video 202.

Indeed, the digital video summary system 102 utilizes an aesthetics scorer 204 to generate aesthetics scores. In particular, the digital video summary system 102 applies the aesthetics scorer 204 to one or more frames of the original digital video 202 to generate aesthetics scores. In some embodiments, the digital video summary system 102 applies the aesthetics scorer 204 to each frame of the original digital video 202 (or a certain selection of frames based on a frame selection rate, such as one frame per second) and utilizes the aesthetics scorer 204 to generate an aesthetics score for each frame. For instance, as mentioned above, the digital video summary system 102 can utilize an aesthetics neural network trained, based on a large-scale aesthetics dataset, to identify frames that are clear and visually appealing.

Thus, the digital video summary system 102 can assign higher aesthetics scores to frames that are more visually appealing. Indeed, as mentioned above, the digital video summary system 102 assigns aesthetics scores on a scale from 0 to 1, where higher scores correspond to a greater visual appeal and lower scores correspond to lesser visual appeal. In some embodiments, instead of generating aesthetics scores on a scale from 0 to 1, the digital video summary system 102 can generate binary aesthetics scores as either a 0 or a 1. In these embodiments, the digital video summary system 102 can filter frames by removing or ignoring those frames that have a 0 score and considering only those frames that have a 1 score. By filtering out frames with an aesthetic score of 0, the digital video summary system 102 can improve the speed of the training process. Thus, the digital video summary system 102 can perform faster and more efficiently than some conventional systems. In embodiments where the digital video summary system 102 generates aesthetics scores within a range from 0 to 1, on the other hand, the digital video summary system 102 can also rank the frames of the original digital video 202 based on their respective aesthetics scores.

Additionally, the digital video summary system 102 utilizes a summarizer 206. In particular, the digital video summary system 102 utilizes the summarizer 206 to generate selected summary frames 208 from the original digital video 202. To generate the selected summary frames 208, the digital video summary system 102 utilizes the summarizer 206 to generate selection scores for video frames and to select those frames with the highest selection scores to include in the selected summary frames 208.

To illustrate, the digital video summary system 102 utilizes the summarizer 206 in conjunction with the aesthetics scorer 204. For example, the digital video summary system 102 utilizes the summarizer 206 to generate selection scores for frames based on the aesthetics scores from the aesthetics scorer 204, where the digital video summary system 102 uses the selection scores as a basis for determining the selected summary frames 208.

In addition, the digital video summary system 102 generates selection scores further based on importance scores. To illustrate, the digital video summary system 102 can generate importance scores on a scale from 0 to 1, where higher scores indicate a higher degree of relevance or importance and lower scores indicate a lower degree of relevance or importance. In some embodiments, the digital video summary system 102 can generate binary importance scores where, for a given frame, the digital video summary system 102 generates an importance score of either a 0 or a 1.

To determine an importance score for a given frame, the digital video summary system 102 utilizes the summarizer 206 to analyze frames of the original digital video 202 to generate, for each analyzed frame, a sequence of deep features. For example, in some embodiments the digital video summary system 102 utilizes a convolutional neural network as part of a relevancy neural network to generate deep features for a given frame. Indeed, the convolutional neural network can be part of the relevancy neural network 218 that the digital video summary system 102 utilizes to generate the sequences of deep features. In some embodiments, however, the convolutional neural network is independent of the relevancy neural network 218.

The digital video summary system 102 further utilize the relevancy neural network 218 to generate importance scores. Indeed, the digital video summary system 102 utilizes the relevancy neural network 218 trained to generate importance scores based on deep features of digital images (e.g., video frames). Thus, based on the selection score (which, in turn, is based on the set of deep features for a given frame, an aesthetics score for the frame, and an importance score for the frame), the digital video summary system 102 utilizes the summarizer 206 to generate the selected summary frames 208.

For example, the digital video summary system 102 can generate the selected summary frames 208 by identifying one or more frames that satisfy particular criteria. For instance, the digital video summary system 102 can generate the selected summary frames 208 by selecting a single frame that has the highest selection score of any analyzed frame. In some embodiments, the digital video summary system 102 can select more than one frame. For example, the digital video summary system 102 can select a set number of frames (e.g., a user-selected number of frames or a system-determined number of frames). As another example, the digital video summary system 102 can select any frame that satisfies a particular selection score threshold (e.g., above 0.5, above 0.7, etc.). In some embodiments, the digital video summary system 102 merely selects all frames of the original digital video 202, each frame with its own respective selection score.

Furthermore, as shown in FIG. 2, the digital video summary system 102 utilizes a reconstructor 210 (e.g., that includes a generative reconstructor neural network 220) to generate a reconstruction 212 (e.g., a digital video reconstruction). As described above, the reconstruction 212 can refer to a digital video reconstruction that the digital video summary system 102 compares to the original digital video 202 to test accuracy. In particular, the digital video summary system 102 identifies a set of deep features corresponding to the selected summary frames 208 from the digital video 202. The digital video summary system 102 feeds the set of deep features for the selected summary frames 208 into the reconstructor 210 that includes the generative reconstructor neural network. In turn, the digital video summary system 102 utilizes the generative reconstructor neural network to generate the reconstruction 212.

The digital video summary system 102 further performs an act 214 to minimize distance. In particular, the digital video summary system 102 compares the reconstruction 212 with the original digital video 202. Based on the comparison, the digital video summary system 102 determines a distance (e.g., a difference or measure of loss) between the reconstruction 210 and the original digital video 202. Furthermore, the digital video summary system 102 can minimize the distance by adjusting parameters (e.g., parameters in the aesthetics scorer 204, the summarizer 206, and/or the reconstructor 210) such that a subsequent reconstruction will be closer (e.g., result in a smaller measure of loss) when compared to the original digital video 202.

Thus, by repeating the process of utilizing the aesthetics scorer 204, the summarizer 206, and the reconstructor 210 to generate selected summary frames 208 and a reconstruction 210, then performing the act 214 of minimizing the distance, the digital video summary system 102 can improve selected summaries (e.g., the subsequent iterations of selected summary frames 208) until the reconstruction 210 is within a threshold similarity (e.g., threshold difference or error) from the original digital video 202.

By generating an accurate reconstruction 212 in this manner, the digital video summary system 102 can generate an accurate, representative selected summary 208. To elaborate, upon determining that the reconstruction 212 satisfies a threshold similarity from the original digital video 202, the digital video summary system 102 can identify the selected summary 208 that corresponds to the satisfactory reconstruction 212 as a set of frames that represent or summarize the original digital video 202. Indeed, selected subset of frames can be reconstructed to a new video that has a minimum difference from the original video, then the selected subset is a representative selection.

The digital video summary system can then utilize the set of frames to generate a digital video summary. For example, the digital video summary system 102 can generate a digital video summary in one or more of a variety of possible formats. To illustrate, the digital video summary system 102 can generate a thumbnail format, a storyboard format, an animated thumbnail format, and/or a video trailer format. To generate a thumbnail format, for example, the digital video summary system 102 can select a frame that has a highest selection score. To generate a storyboard format, the digital video summary system 102 can select a plurality of frames with top selection scores.

To generate an animated digital video summary such as an animated thumbnail or video trailer, on the other hand, the digital video summary system 102 can divide the digital video 202 into segments and can score each segment independently based on selection scores of frames contained within each segment. Then, based on the segment scores, the digital video summary system 102 can select one or more segments to use as a digital video summary. For an animated thumbnail, for instance, the digital video summary system 102 can select a single segment that contains the frame with the highest selection score.

For a video trailer, on the other hand, the digital video summary system 102 can select more than one segment based on the selection scores of constituent frames and can arrange the segments in temporal order so that, when viewed together, the frames of the video trailer appear in chronological order, the same as in the original digital video 202. Additional detail regarding digital video summary formats is provided below with reference to FIGS. 7A-7D.

Figure 3:
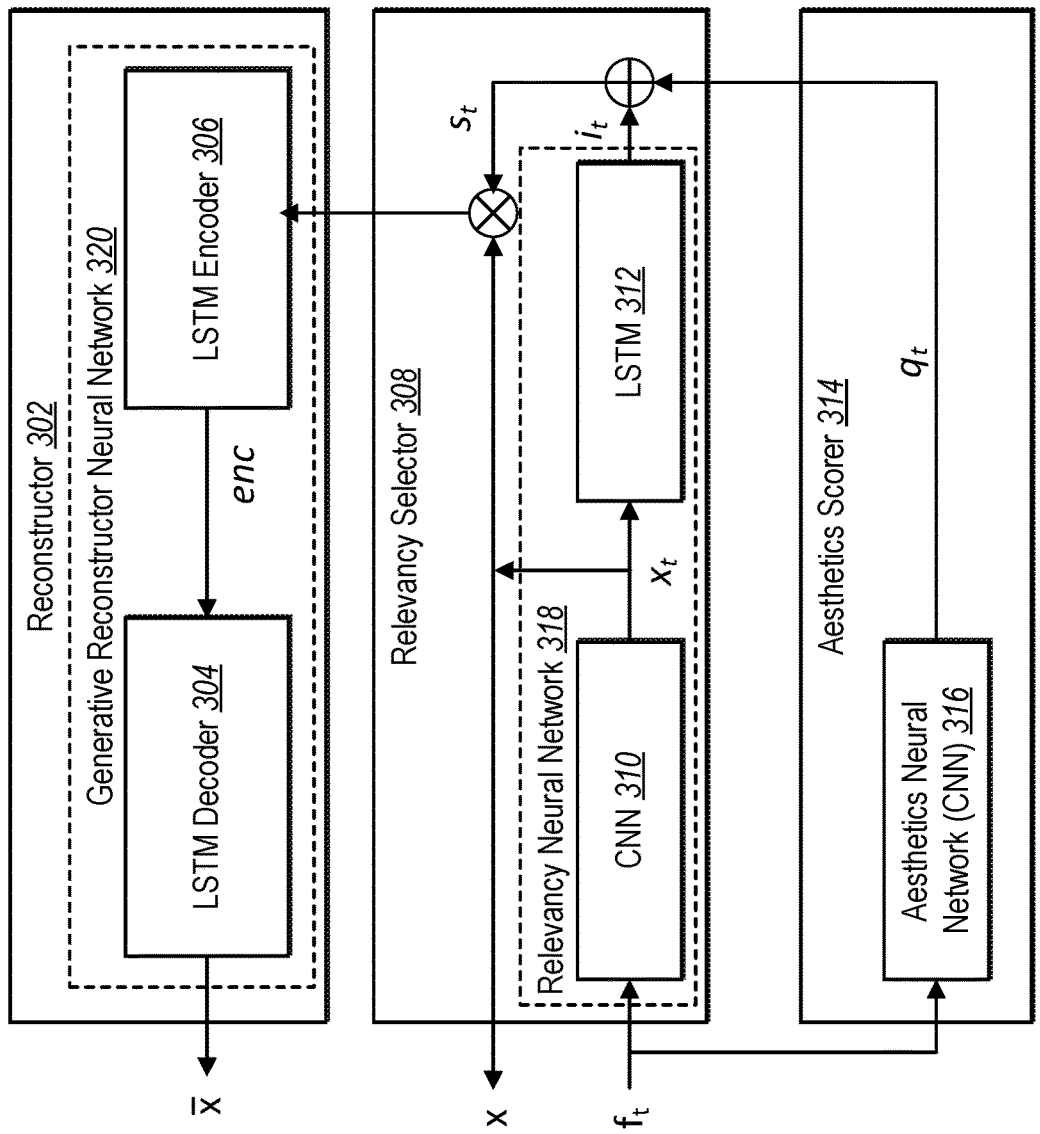
FIG. 3 illustrates an architecture for a digital video summary model for generating digital video summaries in accordance with one or more embodiments.

Turning now to FIG. 3 additional detail is provided regarding a digital video summary model utilized by the digital video summary system 102, including an aesthetics scorer 314 (e.g., the aesthetics scorer 204), a relevancy selector 308 (e.g., the summarizer 206), and a reconstructor 302.

As shown in FIG. 3, the digital video summary system 102 utilizes an aesthetics scorer 314. In particular, the digital video summary system 102 utilizes an aesthetics scorer 314 in the form of an aesthetics neural network 316 to generate aesthetics scores for frames of a digital video. Indeed, as illustrated, the aesthetics neural network 316 can be a convolutional neural network. The digital video summary system 102 inputs frames $f_t$ (e.g., each frame or a subset of all of the frames) of a digital video x and utilizes the aesthetics neural network 316 to generate aesthetics scores $q_t$ for the frames $f_t$. As mentioned, the digital video summary system 102 generates aesthetics scores $q_t$ on a scale from 0 to 1, given by $q_t \in [0,1]$, where $q_t=0$ indicates a frame of a poor aesthetics score and $q_t=1$ indicates a frame of the highest image quality. In some embodiments, however, the digital video summary system 102 generates discretized or binary aesthetics scores $q_t$ given by $q_t \in \{0,1\}$. Based on generating binary aesthetics scores, the digital video summary system 102 can utilize the aesthetics neural network as a sort of filter to ignore or remove from consideration in generating digital video summaries those frames whose aesthetics scores are 0.

In addition, the digital video summary system 102 trains the aesthetics neural network 316 based on a large-scale visual aesthetic dataset. To elaborate, in some embodiments the digital video summary system 102 trains the aesthetics neural network 316 by fine-tuning the fully-connected layers of an InceptionV3 network.

In some embodiments, the digital video summary system 102 is more efficient by implementing a grid reduction technique to generate the aesthetic neural network 316. Indeed, in one or more embodiments, the digital video summary system 102 utilizes the following architecture for the aesthetics neural network 316:

| Type of Layer | Patch Size/Stride or Remarks | Input Size |
|---|---|---|
| conv | 3 × 3/2 | 299 × 299 × 3 |
| conv | 3 × 3/1 | 149 × 149 × 32 |
| conv padded | 3 × 3/1 | 147 × 147 × 32 |
| pool | 3 × 3/2 | 147 × 147 × 64 |
| conv | 3 × 3/1 | 73 × 73 × 64 |
| conv | 3 × 3/2 | 71 × 71 × 80 |
| conv | 3 × 3/1 | 35 × 35 × 192 |
| 3 × Inception | Each 5 × 5 convolution is replaced by two 3 × 3 convolutions | 35 × 35 × 288 |
| 5 × Inception | Factorization of the n × n convolutions, where, for example, n = 7 | 17 × 17 × 768 |
| 2 × Inception | Expanded filter bank outputs | 8 × 8 × 1280 |
| pool | 8 × 8 | 8 × 8 × 2048 |
| linear | logits | 1 × 1 × 2048 |
| softmax | classifier | 1 × 1 × 1000 |

In one or more embodiments, the digital video summary system 102 utilizes a structure of an InceptionV3 network as set forth in Christian Szegedy, Vincent Vanhoucke, Sergey Ioffe, Jon Shlens, and Zbigniew Wojna, *Rethinking the Inception Architecture for Computer Vision*, Proceedings of the IEEE Conference on Computer Vision and Pattern Recognition (CVPR), 2818-2826 (2016), which is incorporated herein by reference in its entirety. In other embodiments, however, the digital video summary system 102 utilizes a neural network having a different architecture, such as AlexNet, VGGNet, or GoogLeNet.

As mentioned, the digital video summary system 102 trains the aesthetics neural network 316 based on a visual dataset. For example, the digital video summary system 102 can tune the parameters of respective layers within the aesthetics neural network 316 (e.g., the InceptionV3 network) using an Aesthetic Visual Analysis ("AVA") or an ImageNet dataset. To illustrate, the digital video summary system 102 can crowdsource visual analysis via an online survey or by some other means to gather information to use as a baseline or ground truth for determining which images (e.g., video frames) have a high degree of visual appeal (e.g., based on visual characteristics of images such as light, color, and composition). In some embodiments, the digital video summary system 102 utilizes an AVA dataset consisting of thousands (or even millions) of images, such as the 255,000 images of the AVA dataset set forth in Naila Murray, Luca Marchesotti, and Florent Perronnin, *Ava: A Large-scale Database for Aesthetic Visual Analysis*, Computer Vision and Pattern Recognition (CVPR), IEEE 2408-2415 (2012), which is incorporated herein by reference in its entirety.

To train the aesthetics neural network 316 to classify video frames based on aesthetics, the digital video summary system 102 can utilize a first dataset (e.g., the ImageNet dataset). Accordingly, the digital video summary system 102 can train the aesthetics neural network 316 to classify frames for 1000 different categories. In addition, the digital video summary system 102 can approximately fix the inception layers of the aesthetics neural network 316 and fine tune a connected layer that contains global features and local features based on a second dataset (e.g., the AVA dataset).

More specifically, the digital video summary system 102 can train the aesthetics neural network 316 by generating, based on a given input training image, a predicted aesthetics score. The digital video summary system 102 can further compare the predicted aesthetics score to a ground truth aesthetics score that corresponds to the given training image. For example, the digital video summary system 102 can utilize a loss function to determine a measure of loss between the predicted aesthetics score and the ground truth aesthetics score. Furthermore, the digital video summary system 102 can implement an error reduction technique to reduce the measure of loss between the predicted score and the ground truth score. The digital video summary system 102 can further modify parameters of the aesthetics neural network 316 based on the determined measure of loss to more accurately generate predicted scores on subsequent iterations. The digital video summary system 102 can repeat the process of generating predicted aesthetics scores based on input images, comparing the predicted scores with ground truth scores to determine an error or loss, reducing the loss, and modifying parameters of the aesthetics neural network 316 to increase the accuracy of the aesthetics neural network 316.

In some embodiments, to train the aesthetics neural network 316 to select framesfi that are visually appealing, the digital video summary system 102 can implement the training technique set forth in Xin Jin, Jingying Chi, Siwei Peng, Yulu Tian, Chaochen Ye, and Xiaodong Li, *Deep Image Aesthetics Classification Using Inception Modules and Fine-tuning Connected Layer*, $8^{th}$ International Conference on Wireless Communications & Signal Processing (WCSP), IEEE 1-6 (2016), which is incorporated herein by reference in its entirety.

As illustrated in FIG. 3, the digital video summary system 102 further utilizes a relevancy selector 308 to select frames $f_t$ of the digital video x to use for the digital video summary. As shown, the relevancy selector 308 includes a relevancy neural network 318, which itself includes a convolutional neural network 310 as well as an LSTM network 312. Although the relevancy neural network 318 is shown as including both the convolutional neural network 310 and the LSTM network 312, in some embodiments, the convolutional neural network 310 is separate from the relevancy neural network 318 (e.g., the relevancy neural network 318 includes the LSTM network 312).

In relation to the embodiment of FIG. 3, the digital video summary system 102 utilizes the convolutional neural network 310 to generate a set or sequence of deep features for the frames $f_t$ of the digital video x. Indeed, the digital video summary system 102 implements the convolutional neural network 310 to generate a deep feature set for each of the frames $f_t$. More specifically, the digital video summary system 102 utilizes the convolution neural network 310 (e.g., in the form of an InceptionV3 network architecture as described above) to extract the deep features. For example, in one or more embodiments, the deep features are the output of the global pooling layer of the Inception V3 network described above (having 2,048 dimensions). To illustrate, the digital video summary system 102 generates a sequence of deep features for frames of the digital video x given by:

$$x=\{x_t; t=1, \ldots, N\}$$

where x represents the digital video or the vector of all deep features for the digital video, $x_t$ represents a given set of deep features (i.e., a feature vector) for a frame of the digital video x, t represents a given frame, and N is the total number of frames.

In some embodiments, the digital video summary system 102 further trains the convolutional neural network 310 to generate the deep features $x_t$. To train the convolutional neural network 310, the digital video summary system 102 utilizes a set of training data including training images (e.g., video frames) and ground truth features for each training image. Accordingly, the digital video summary system 102 inputs a training image into the convolutional neural network 310 to generate predicted features for the training image. The digital video summary system 102 further compares the predicted features with the ground truth features (e.g., by utilizing a loss function) and modifies parameters of the convolutional neural network 310 to minimize the loss. Thus, by repeatedly generating predicted features to compare with ground truth features and subsequently minimizing loss between them, the digital video summary system 102 trains the convolutional neural network 310 to accurately generate feature vectors for video frames.

In addition, the digital video summary system 102 utilizes the relevancy neural network 318 to generate importance scores for frames of the digital video x based on the deep features $x_t$. As shown, the digital video summary system 102 utilizes the relevancy neural network 318 with a bidirectional LSTM network 312. In other embodiments, the digital video summary system 102 utilizes a relevancy neural network with a different architecture (such as an additional convolutional neural network).

By utilizing the LSTM network 312, the digital video summary system 102 can take advantage of LSTM architecture to account for sequential data (e.g., sequential frames) in analyzing input (e.g., an input digital video). For example, the digital video summary system 102 utilizes the LSTM network 312 to concurrently analyze multiple individual frames within the LSTM network 312. To illustrate, the LSTM network 312 can include a number of blocks (sometimes referred to as "context units" or simply "units") that each analyze a different frame of an input digital video while preserving its sequential order. Each block generates an output vector as well as a latent vector that the digital video summary system 102 passes to an adjacent block that corresponds to a next video frame in the sequence. Thus, by utilizing the LSTM 312, the digital video summary system 102 considers temporal dependency between frames. Accordingly, the output of each block is based not only on its respective input frame, but also on the latent vectors received from adjacent blocks. Additionally, in embodiments where the digital video summary system 102 utilizes a bidirectional LSTM, the digital video summary system 102 passes latent vectors between LSTM blocks in both directions in the context of the sequence of video frames.

Utilizing the LSTM network 312, the digital video summary system 102 generates a one-dimensional vector of normalized importance scores for the frames of the digital video x, given by:

$$i=\{i_t \in [0,1]: t=1, \ldots, N\}$$

where i is the vector of importance scores, $i_t$ represents an importance score for a given frame on a scale from 0 to 1, t represents a given frame, and N represents the total number of frames of the digital video x. Indeed, as mentioned above, the digital video summary system 102 generates importance scores to indicate a relevance of a frame to the original digital video. Thus, the digital video summary system 102 generates importance scores on a scale from 0 to 1, where lower scores represent frames that are less relevant and higher represent frames that are more relevant. In some embodiments, the digital video summary system 102 generates discretized importance scores, given by $i_t \in \{0,1\}$, where a 0 represents an irrelevant frame and a 1 represents a relevant frame.

Additionally, the digital video summary system 102 trains the LSTM network 312 to generate importance scores. To illustrate, the digital video summary system 102 can train the LSTM network 312 based on training data that includes training feature vectors and ground truth importance scores. Thus, the digital video summary system 102 can input a training digital video into the LSTM network 312 to generate a predicted representative frame based on analyzing each frame of the training digital video. Based on analyzing the individual frames, the LSTM network 312 generates predicted importance scores corresponding for the frames. In addition, the LSTM network 312 generates a predicted representative frame for the training digital video. The digital video summary system 102 can further compare the predicted training representative frame with a corresponding ground truth representative frame to determine an error or measure of loss between them. Indeed, the digital video summary system 102 can determine a ground truth representative frame based on crowdsourced information where human users vote on or select frames that represent training digital videos. In addition, the digital video summary system 102 can modify parameters of the LSTM network 312 to increase accuracy of predicted importance scores of each individual frame and/or the predicted representative frame on subsequent iterations. Indeed, by repeating the training process, the digital video summary system 102 can improve the accuracy of the LSTM network 312 until the generated predictions eventually satisfy a threshold loss.

As illustrated in FIG. 3, the digital video summary system 102 further generates selection scores $s_t$ for frames of the digital video x to determine which frames $f_t$ to select for the digital video summary. As shown in FIG. 3, the digital video summary system 102 generates selection scores based on the importance scores $i_t$ and the aesthetics scores $q_t$, where the selection scores are represented by:

$$s = \{s_t \in [0,1]: t = 1, \ldots, N\}$$

where s is the vector of all selection scores for the frames of the digital video x, $s_t$ represents a selection score for a given frame, t represents a given frame, and N represents the total number of frames. Inn some embodiments the digital video summary system 102 generates discretized selection scores given by $s_t \in \{0,1\}$.

In relation to the embodiment of FIG. 3, the digital video summary system 102 generates selection scores $s_t$ by generating linear combinations of importance scores $i_t$ and the aesthetics scores $q_t$. Indeed, the digital video summary system 102 generates a linear combination given by:

$$s_t = \alpha i_t + \beta q_t$$

where $s_t$ represents a selection score, $i_t$ represents a corresponding importance score, $q_t$ represents a corresponding aesthetics score, $\alpha$ represents a weight for the importance score, and $\beta$ represents a weight for the aesthetics score. By considering both the importance scores and the aesthetics scores, the digital video summary system 102 selects frames of the digital video x that are both aesthetically appealing and relevant to include in the digital video summary. In some embodiments, the digital video summary system 102 can receive user input to set $\alpha$ and $\beta$, while in other embodiments, the weight parameters may be system-defined. For example, in some embodiments, the digital video summary system 102 can set $\alpha=0.75$ and $\beta=0.25$.

In addition, the digital video summary system 102 utilizes the relevancy selector 308 (e.g., the relevancy neural network 318) to select a subset of frames (e.g., the selected summary frames 208). To select summary frames, the digital video summary system 102 weights the feature vector of each frame by its corresponding selection score. Thus, in some embodiments the digital video summary system 102 selects one or more frames that have the greatest weight or the highest selection score(s) for the digital video summary.

Indeed, the digital video summary system 102 can rank frames according to selection scores. As described above, in cases where the digital video summary system 102 generates thumbnails or storyboards, the digital video summary system 102 can rank highest those frames with the highest selection scores within the digital video as a whole. In cases where the digital video summary system 102 generates animated thumbnails or video trailers, the digital video summary system 102 can rank frames in a compartmentalized fashion, where each divided segment of the digital video has its own ranking of frames (i.e., where the digital video summary system 102 utilizes the aesthetics neural network 314 and the relevancy neural network 308 to select frames from each segment individually). Additional detail regarding dividing a digital video into segments is provided below with reference to FIGS. 7A-7D.

As further shown in FIG. 3, the digital video summary system 102 utilizes a reconstructor 302 to generate a digital video reconstruction. In particular, the digital video summary system 102 generates a reconstructed video sequence $\bar{x}$ (e.g., a reconstructed video feature vector) based on the selected frames of the original video sequence x. In some embodiments, the digital video summary system 102 utilizes a reconstructor 302 in the form of a generative reconstructor neural network 320 that includes both an encoder 306 and a decoder 304. In some embodiments, the encoder 306 and the decoder 304 are each bidirectional LSTM networks. In other embodiments, however, the encoder 306 and the decoder 304 can be different types of neural networks.

In addition, the digital video summary system 102 utilizes the encoder 306 to take the sequence of deep features of the digital video, x, as input (e.g. a subset of deep features corresponding to the selected frames). Indeed, as mentioned, the digital video summary system 102 can weight each of the sets of deep features for individual frames by their respective selection scores. Thus, the digital video summary system 102 can feed the weighted feature vectors of each frame (e.g., together with the selected frames) into the encoder 306 to generate a fixed length encoded feature vector enc, as shown in FIG. 3. Indeed, the digital video summary system 102 can generate the encoded vector enc by utilizing the encoder 306, where the state of the encoder 306 after the last feature vector of x has been input is the full representation of the input sequence.

In one or more embodiments, the digital video summary system 102 utilizes the selection scores as part of an attention layer in the LSTM encoder 306. In particular, the digital video summary system 102 utilizes the selection scores as an attention mechanism to draw attention to summary frames and accurately reproduce a digital video reconstruction from the summary frames. To illustrate, the LSTM encoder 306 can produce a latent feature vector for each input frame. The digital video summary can apply the selection scores as an attention mechanism to the latent feature vector for each frame and then generate the encoded vector, enc. This approach allows the generative reconstruct neural network 320 to attend more specifically to particular digital frames in generating a digital video reconstruction rather than relying only on a fixed-size input vector.

Based on utilizing the encoder 306 to generate the encoded vector enc, the digital video summary system 102 further utilizes the decoder 304 to generate the digital video reconstruction (e.g., a feature vector that represents a reconstruction of the original digital video) $\bar{x}$. As described above, the digital video summary system 102 can generate the digital video reconstruction $\bar{x}$ in an unsupervised manner. Indeed, by utilizing a generative reconstructor neural network, the digital video summary system 102 more efficiently generates the digital video reconstruction $\bar{x}$ relative to alternative systems by requiring less training data than supervised models.

In some embodiments, the digital video summary system 102 implements the reconstruction technique described in Nitish Srivastava, Elman Mansimov, and Ruslan Salakhudinov, *Unsupervised Learning of Video Representations Using LSTMs*, International Conference on Machine Learning, 843-852 (2015), which is incorporated herein by reference in its entirety.

Although not illustrated in FIG. 3, in some embodiments the digital video summary system 102 further includes a semantic neural network. Indeed, the digital video summary system 102 can include a semantic neural network in conjunction with the aesthetics neural network 316 and the relevancy neural network 318. By utilizing a semantic neural network, the digital video summary system 102 can generate semantic scores for frames of a digital video based on semantic data associated with the frames. For example, the semantic neural network can generate semantic scores based on metadata (e.g., tags, timestamps, etc.) of the video frames.

To illustrate, in some embodiments, the digital video summary system 102 can train and/or utilize a semantic neural network to generate semantic scores on a scale from 0 to 1, where higher scores indicate a higher semantic value and lower scores indicate a lower semantic value. In other embodiments, the digital video summary system 103 can utilize the semantic neural network to generate binary semantic scores (e.g., a 0 or a 1) where a 0 indicates no semantic (or a semantic relevance below a threshold) relevance and a 1 indicates at least some semantic relevance (or a semantic relevance above a threshold). Indeed, the digital video summary system 102 can generate a higher semantic score for a frame that has a metatag that is the same as or is closely related to (in a semantic sense) a topic or depiction of a digital video (as indicated by metadata, visual analysis, or otherwise). As an example, in a scenario where the digital video summary system 102 is generating a digital video summary for a digital video that largely depicts features of a particular pocket knife, the digital video summary system 102 can utilize the semantic neural network to generate a higher semantic score for a frame that has a metatag of "knife" and a lower score for a frame that has a tag of "trees."

Accordingly, the digital video summary system 102 can further utilize the semantic scores in generating selection scores for video frames. Similar to the discussion above, the digital video summary system 102 can generate a linear combination by:

$$s_t = \alpha i_t + \beta q_t + \gamma k_t$$

where $s_t$ represents a selection score, $i_t$ represents a corresponding importance score, $q_t$ represents a corresponding aesthetics score, $k_t$ represents a semantic score, $\alpha$ represents a weight for the importance score, $\beta$ represents a weight for the aesthetics score, and $\gamma$ represents a weight for the semantic score.

Figure 4:
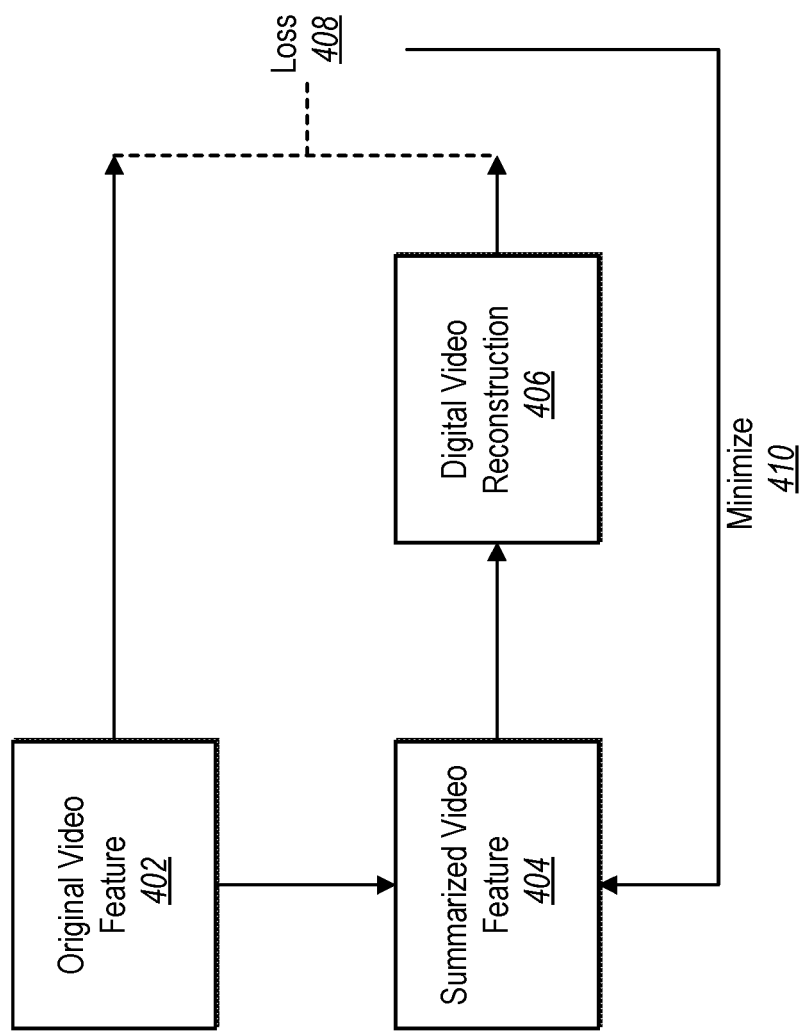
FIG. 4 illustrates minimizing loss to improve the accuracy of the digital video summary system in accordance with one or more embodiments.

In addition, the digital video summary system 102 compares the digital video reconstruction $\bar{x}$ with the original digital video x. Indeed, FIG. 4 illustrates the process of determining the loss between the digital video reconstruction and the original digital video. As illustrated, the digital video summary system 102 utilizes a loss function to determine a measure of loss 408 between the reconstruction 406 (e.g., the digital video reconstruction $\bar{X}$) and the original video feature 402 (e.g., the original digital video x). In addition, the digital video summary system 102 performs act 410 to minimize the measure of loss 408 and to modify parameters of one or more of the aesthetics scorer 314 (e.g. internal weighting parameters of the aesthetics neural network 316), the relevancy selector 308 (e.g., internal weighting parameters the relevancy neural network 318), and/or the generative reconstructive neural network 320.

In addition, the digital video summary system 102 can repeat the process shown in FIGS. 3-4 to improve the accuracy of generating digital video summaries. Thus, the digital video summary system 102 can continuously perform iterations of the process illustrated in FIGS. 3-4 until the loss is within a threshold loss. To illustrate, the digital video summary system 102 can repeat the process of generating the summarized video feature 404 (as described in relation to FIG. 3), generating the reconstruction 406 (as described in relation to FIG. 3), determining a loss between the reconstruction 406 and the original video feature 402, and minimizing the determined loss 408.

After various iterations of repeating this process, the digital video summary system 102 determines that the loss 408 satisfies a threshold. In response to determining that the measure of loss between the digital video reconstruction and the original digital video satisfies a threshold, the digital video summary system 102 can further determine that the corresponding summarized video feature 404 is to be used as the digital video summary. In other words, the digital video summary system 102 can identify that the selected frame(s) that correspond to the satisfactory digital video reconstruction—i.e., the frames that the relevancy neural network 308 selects within that respective iteration—are to be used for the digital video summary. In some embodiments, instead of repeating the process of FIGS. 3-4 until the loss 408 satisfies a threshold, the digital video summary system 102 repeats the process for a particular number of iterations (e.g., a user-defined number or a system-defined number). In other embodiments, the digital video summary system 102 repeats the process for a particular amount of time—i.e., the digital video summary system 102 repeats the process until a threshold amount of time expires.

By performing multiple iterations of generating a modified digital video to compare with the original digital video, and modifying parameters of the various constituent neural networks, the digital video summary system 102 selects increasingly accurate representative frames from the digital video. These frames, and the resulting digital video summary are thus based on the frames of the digital video; their corresponding feature vectors; aesthetic, relevancy, and selection scores; and one or more digital video reconstructions.

Figure 5:
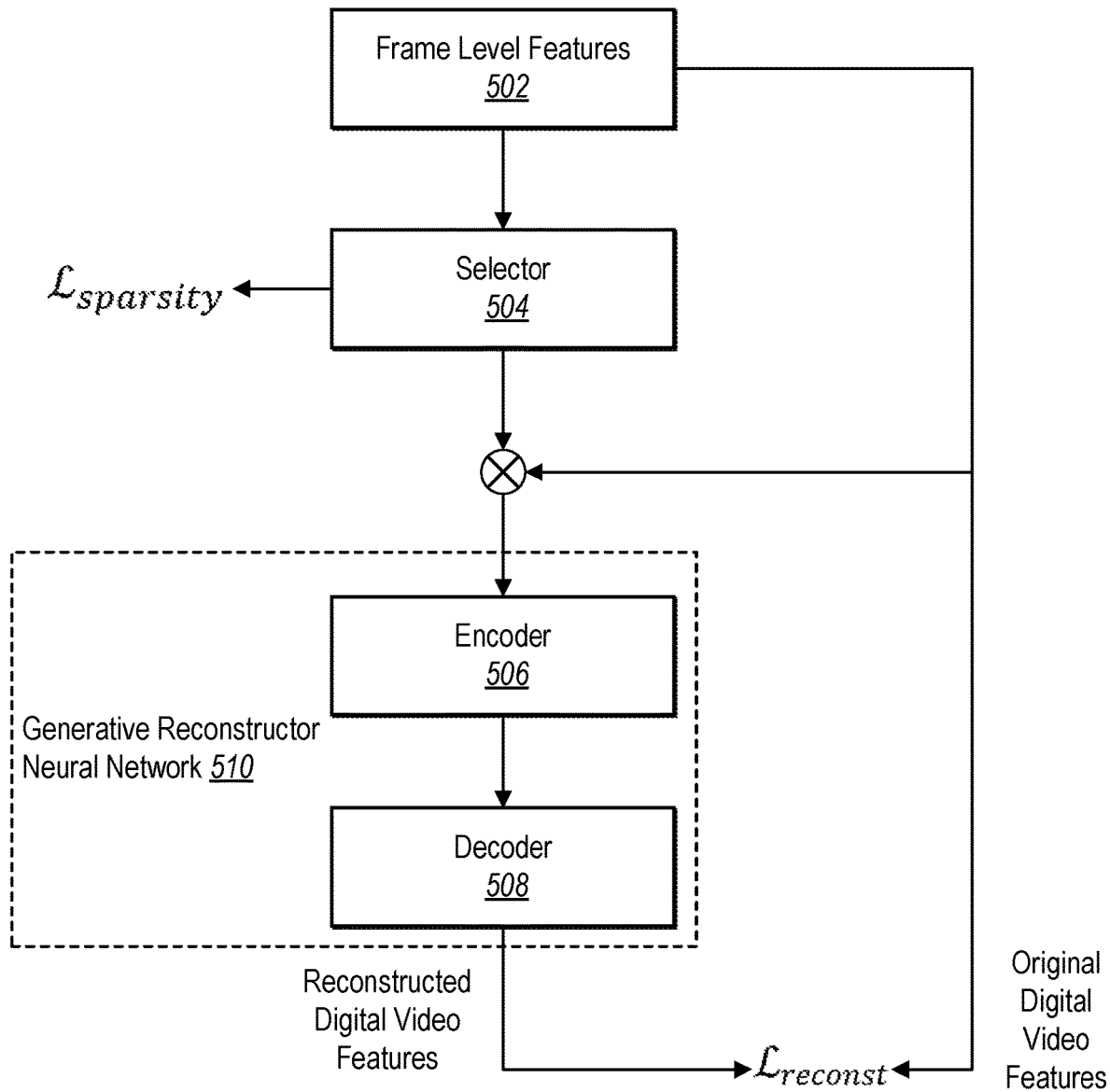
FIG. 5 illustrates utilizing a loss function in accordance with one or more embodiments.

Depending on the embodiment, the digital video summary system 102 can utilize different loss functions for the processes described in relation to FIGS. 3 and 4. In some embodiments, the digital video summary system 102 can implement a reconstruction loss function. Indeed, FIG. 5 illustrates a process of utilizing a reconstruction loss function in accordance with one or more embodiments. In some embodiments, the reconstruction loss function is a mean squared error loss function or a variation thereof. For example, the digital video summary system 102 can utilize a reconstruction loss function given by:

$$\mathcal{L}_{reconst} = \|x - \bar{x}\|_2$$

where x represents the original digital video (i.e., the features of the original digital video) and x̄ represents the digital video reconstruction.

As shown, the digital video summary system 102 determines frame level features 502 for the original video features. For example, the digital video summary system 102 implements a convolutional neural network to extract sequences of deep features for the frames of the digital video, as described above. In addition, the digital video summary system 102 utilizes the selector 504 to generate selection scores for the frames of the digital video based on their respective sets of deep features. As described, the digital video summary system 102 utilizes a selector to determine importance scores (i.e., relevancy scores) for frames of the digital video and to further determine selection scores based on the importance scores as well as determined aesthetics scores.

As further shown, the digital video summary system 102 weights the original video features by the determined selection scores to use in the encoder 506. As described above, the digital video summary system 102 utilizes the encoder 506 and decoder 508 (e.g., as part of a generative reconstructor neural network 510) to generate reconstructed video features. In addition, the digital video summary system 102 utilizes a reconstruction loss function $\mathcal{L}_{reconst}$ to compare the reconstructed video features and original video features. Indeed, by utilizing the reconstruction loss function, the digital video summary system 102 determines a measure of loss between the reconstructed video features and the original video features. Additionally, the digital video summary system 102 minimizes the determined loss or difference and modified parameters of the selector 504, the encoder 506, and/or the decoder 508 to improve the accuracy of the reconstructed video features on subsequent iterations.

Although not illustrated in FIG. 5, in some embodiments the digital video summary system 102 can utilize additional loss functions. Indeed, in addition to the process of FIG. 5, the digital video summary system 102 can utilize an additional loss function such as a sparsity loss function or a repelling sparsity loss function. In one or more embodiments, the digital video summary system 102 utilizes a sparsity loss function to discourage selection of every single frame. For instance, the digital video summary system 102 can utilize a sparsity loss function to encourage sparsity in the selection of frames from a digital video—i.e., to avoid selecting too many frames. To illustrate, the digital video summary system 102 can utilize a sparsity loss function given by:

$$\mathcal{L}_{sparsity} = \left\|\sum_{t=1}^{N}(i_t - \delta)\right\| + \sum_{t=1}^{N} \text{entropy}(i_t)$$

where the first term, $\|\Sigma_{t=1}^{N}(i_t-\delta)\|$, penalizes the action where the selector 504 selects many frames, N is the total number of frames of the original video, $i_t$ is the importance/relevance score of the $t^{th}$ frame (of 1, the selection vector), and δ is a parameter indicating a proportion of the maximum number of frames that the digital video summary system 102 can select in relation to N. The digital video summary system 102 utilizes the second term, $\Sigma_{t=1}^{N} \text{entropy}(i_t)$, to determine the entropy of the entire selection vector, thereby encouraging strong opinions of selecting or not selecting a given frame to avoid too uniform a score.

In some embodiments, the digital video summary system 102 can implement a different loss function to avoid selecting frames that are too similar in appearance. In particular, when generating storyboards or video trailers, it may be desirable to have frames that are not necessarily homogenous in appearance to give an accurate summary of a digital video from start to finish. To this end, the digital video summary system 102 can utilize a repelling sparsity loss function (in conjunction with a repelling regularizer) to address this concern. By utilizing a repelling sparsity loss function, the digital video summary system 102 encourages sparsity in selecting frames (by penalizing selection of too many frames) and further encourages spacing (e.g., gaps of unselected frames) between selections. For example, the digital video summary system 102 can utilize a repelling sparsity loss function given by:

$$\mathcal{L}_{sparsity}^{rep} = \frac{1}{N(N-1)} \sum_{t} \sum_{t' \neq t} \left(\frac{h_t^T h_{t'}}{\|h_t\|\|h_{t'}\|}\right)^2$$

where $h_t$ is the hidden state of the LSTM encoder at time t. By utilizing a repelling regularizer, the digital video summary system 102 penalizes selecting from data clustered too close together and attempts to orthogonalize the pairwise sample representation of a selection. Indeed, the repelling regularizer encourages diversity in selecting frames.

As illustrated in FIG. 5, the digital video summary system 102 utilizes a generative reconstructor neural network that comprises an autoencoder (e.g., an LSTM autoencoder) consisting of the encoder 506 and the decoder 508. Alternatively, the digital video summary system 102 can utilize a variational autoencoder ("VAE"), a generative adversarial network ("GAN"), or a combination of a VAE and a GAN to generate a digital video reconstruction based on determined selection scores. Indeed, FIG. 6 illustrates a process of utilizing a loss function in embodiments where the digital video summary system 102 implements a VAE, a GAN, or a combination thereof.

In particular, in embodiments where the digital video summary system 102 utilizes a GAN, the generative reconstructor neural network 612 can include the encoder 606, the decoder 608, and the discriminator 610. To elaborate on utilizing a GAN, the digital video summary system 102 can utilize a generator (e.g., which can include the encoder 606 and the decoder 608) in competition with the discriminator 610. For example, the generator generates digital video reconstructions in an attempt to fool the discriminator 610 into identifying them as the original digital video. The generator generates such reconstructions based on a generator loss function $G_{loss}$). The discriminator 610 distinguishes between real (e.g., original) and fake (e.g., reconstructed) videos based on a discriminator loss function ($D_{loss}$). By repeating the process of generating and testing frames and modifying parameters of the loss functions, the discriminator 610 and the generator each get more and more accurate.

Figure 6:
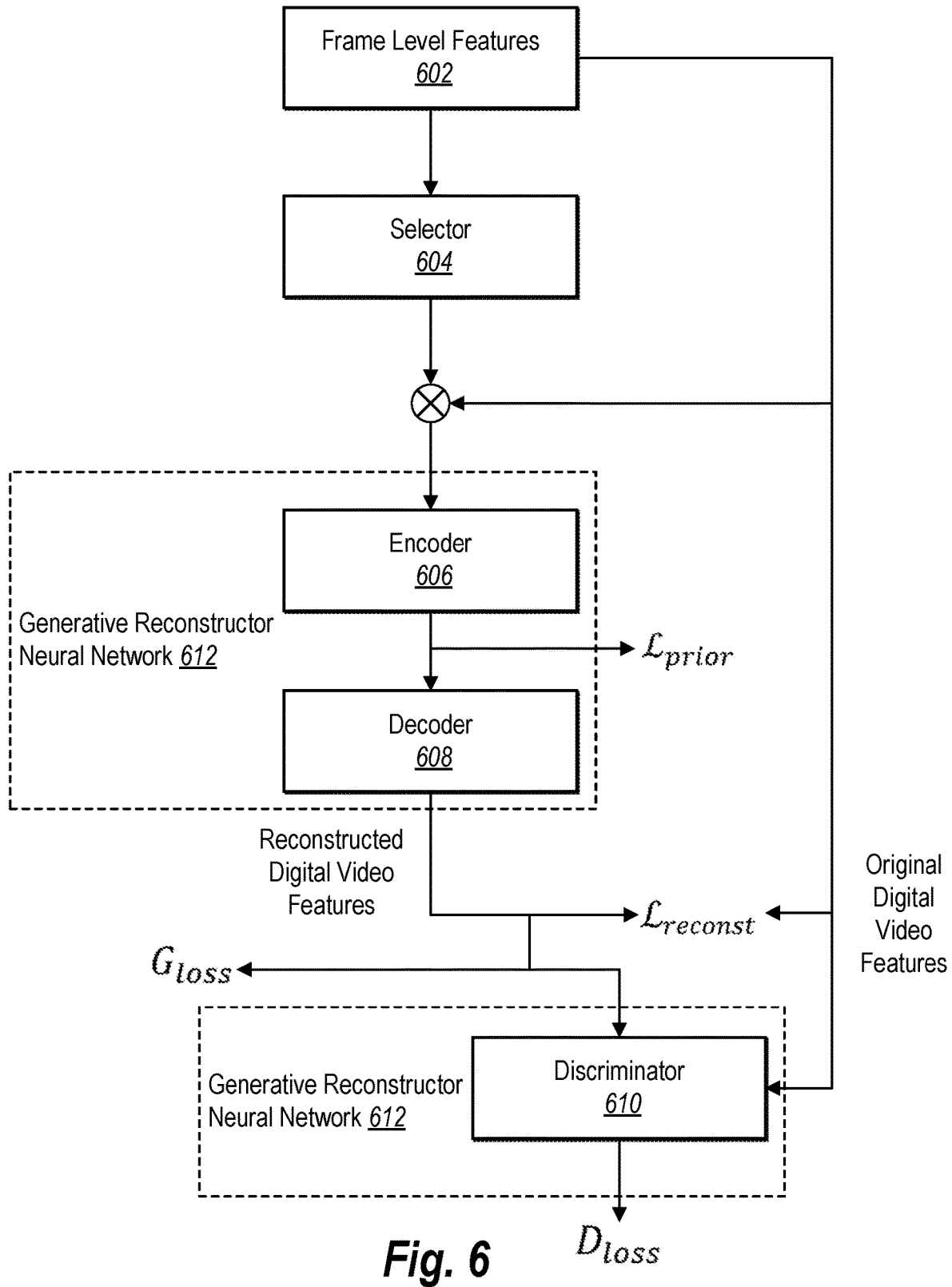
FIG. 6 illustrates utilizing an additional loss function in accordance with one or more embodiments.

In embodiments where the digital video summary system 102 utilizes a VAE, the digital video summary system 102 can implement a structure similar to that shown in FIG. 6, but without the discriminator 610. In other words, in these embodiments the generative reconstructor neural network 612 can include the encoder 606 and the decoder 608. To elaborate on utilizing a VAE, the digital video summary system 102 utilizes the encoder 606 to generate a small, dense representation of input data (e.g., selected frames) in the form of latent vectors specifically useful for reconstructing its own output based on a loss function (i.e., a negative log-likelihood with a regularizer). In particular, the a VAE can be trained utilizing a reconstruction loss and a prior loss (e.g., the Kullback-Leibler divergence between the encoder's generation distribution and an input distribution).

To illustrate, in embodiments where the digital video summary system 102 utilizes a VAE, the digital video summary system 102 implements a directed graphical model which defines a posterior distribution over observed data, given an unobserved latent variable. In these embodiments, the digital video summary system 102 can determine reconstruction loss by utilizing a negative log likelihood distribution function (i.e., a cross entropy loss function). For example, the digital video summary system 102 can determine the reconstruction loss by:

$$\mathcal{L}_{reconst} = -\mathbb{E}_{q(e|x)}[\log p(\phi(x)|e)] \propto \exp(-\|\phi(x) - \phi(\bar{x})\|^2)$$

where x represents the original digital video (i.e., the features of the original digital video) and $\bar{x}$ represents the digital video reconstruction, q(e|x) is the probability of observing e given x, and $\phi(x)$ is the output of the last hidden layer in the discriminator 610.

Accordingly, let $p_e(e)$ be a prior over the unobserved latent variable, and let x be the observed data. Thus, the digital video summary system 102 can implement a VAE loss function given by:

$$\mathcal{L}_{VAE} = \frac{p(x|e)p(e)}{q(e|x)} = \mathcal{L}_{reconst} + \mathcal{L}_{prior}$$

where $$\mathcal{L}_{prior} = D_{KL}(q(e|x) \| p(e))$$

and where e is the encoding of x, q(e|x) is the probability of observing e given x, $p_e(e)$ is the standard normal distribution, p(x|e) is the conditional generative distribution of x. In addition, the digital video summary system 102 can minimize the VAE loss by minimizing the negative log-likelihood of the data distribution.

As shown, the process illustrated in FIG. 6 is similar to that of FIG. 5. Indeed, the digital video summary system 102 extracts frame level features 602 using a convolutional neural network, utilizes a selector 604 to determine selection scores, and generates the reconstructed video features by way of an encoder 606 and a decoder 608 in the same manner as discussed in relation to FIG. 5. However, as shown in FIG. 6, the digital video summary system 102 can utilize a GAN-based approach, which includes the use of the discriminator 610. For example, the digital video summary system 102 can utilize a discriminator 610 in the form of a bidirectional LSTM binary sequence classifier. To utilize the discriminator 610 to distinguish between an original digital video and a digital video reconstruction (e.g., as produced by the generator), the digital video summary system 102 can determine a reconstruction loss, $\mathcal{L}_{reconst}$, a generator loss, $G_{loss}$, and a discriminator loss, $D_{loss}$. For example, the digital video summary system 102 can implement loss functions given by:

$$\mathcal{L}_{reconst} = MSE(x, \bar{x})$$

$$G_{loss} = \mathbb{E}((gscore - 1)^2)$$

$$D_{loss} = \mathbb{E}((rscore - 1)^2) + \mathbb{E}(gscore^2)$$

where gscore is the output of the generator and rscore is the output of the discriminator. In these embodiments, the digital video summary system 102 can further apply $\mathcal{L}_{sparsity}$ (described above) to the relevancy selector 604.

In embodiments where the digital video summary system 102 implements a VAE in combination with a GAN, the digital video summary system 102 uses a pre-trained decoder (e.g., decoder 608) in the VAE and further pre-trains a discriminator (e.g., the discriminator 610). Indeed, FIG. 6 illustrates an embodiment where the digital video summary system 102 utilizes a VAE in combination with a GAN. As shown, the digital video summary system 102 utilizes a VAE which consists of the encoder 606 and the decoder 608 and which, in the context of a GAN, can functionally operate as a generator. Thus, as further shown, the digital video summary system 102 utilizes the VAE as a generator adversarial to the discriminator 610. Accordingly, the digital video summary system 102 can utilize a combination of above-described loss functions such as $\mathcal{L}_{VAE}$, $G_{loss}$, $D_{loss}$, as well as $\mathcal{L}_{sparsity}$ for the relevancy selector 604.

As mentioned, the digital video summary system 102 can generate digital video summaries in a variety of formats such as thumbnails, storyboards, animated thumbnails, and video trailers. FIGS. 7A-7D illustrate generating digital video summaries in accordance with one or more embodiments. In particular, FIGS. 7A-7D provides detail regarding generating thumbnails, storyboards, animated thumbnails, and video trailers.

FIG. 7A illustrates generating a digital video summary in the form of a thumbnail to represent a digital video. In particular, the digital video summary system 102 performs an act 702 of determining selection scores for frames of a digital video, and further performs an act 704 of selecting a frame (or frames) based on the selection scores. As described above, the digital video summary system 102 performs the act 702 to determine selection scores by utilizing an aesthetics neural network and a relevancy neural network to determine linear combinations of aesthetics scores and importance scores for the sequences of deep features representing video frames.

In one or more embodiments, the digital video summary system 102 can determine selection scores for a plurality of frames of the digital video and select a frame that has the highest selection score from among the frames as the thumbnail. For example, in some embodiments the digital video summary system 102 utilizes the relevancy neural network to rank the frames of the digital video in order of selection scores. Thus, the digital video summary system 102 can select the highest-ranked frame for the thumbnail to represent the digital video.

In some embodiments, the digital video summary system 102 can select one or more thumbnails according to parameters of the sparsity loss function. To illustrate, the digital video summary system 102 can generate m candidate thumbnails by setting the parameter δ of the sparsity loss function, $\mathcal{L}_{sparsity}$, to be $$\frac{m}{N}.$$

As described, the digital video summary system 102 further repeat the process of generating a thumbnail via the various neural networks until convergence and can extract the selected thumbnail(s) for the digital video summary.

FIG. 7B illustrates a process for generating a digital video summary in the form of a storyboard. In particular, the digital video summary system 102 performs an act 706 of determining selection scores for the frames of a digital video (e.g., as described above in relation to FIGS. 2-6). In addition, the digital video summary system 102 performs an act 708 of selecting a set of frames based on the selection scores.

For example, in one or more embodiments, the digital video summary system 102 performs the act 708 by selecting a set of frames that satisfy a threshold score. To illustrate, in some embodiments, the digital video summary system 102 selects frames that have a selection score above a threshold (e.g., 0.5 or 0.7 or 0.9). Similarly, in one or more embodiments, the digital video summary system 102 selects a threshold number of frames (e.g., the top three frames).

Similar to thumbnails, the digital video summary system 102 can also generate a storyboard (with a particular number of frames) utilizing a sparsity loss function. Moreover, as described above, the digital video summary system 102 can utilize a repelling sparsity loss function (with a repelling regularizer) to discourage clusters of frames from the same portions of the digital video. Thus, in performing the act 706 of determining selection scores, the digital video summary system 102 can utilize a repelling sparsity loss function to more accurately determine storyboards that reflect different portions from a digital video.

Because the digital video summary system 102 can select frames in order of their respective scores, the digital video summary system 102 sometimes selects scores out of temporal order—i.e., out of the order in which they occur within the original digital video. Accordingly, the digital video summary system 102 can also perform an act 710 of arranging the selected frames in temporal order. For example, the digital video summary system 102 can analyze metadata or other information associated with the frames to determine a time associated with each frame. The digital video summary system 102 can arrange the selected frames in the order in which they appear in the digital video. In this way, the digital video summary system 102 can generate a storyboard that consists of a number of relevant frames that accurately summarize the digital video from start to finish.

In some embodiments, the digital video summary system 102 can perform an additional act of segmenting a digital video as part of generating a storyboard. For example, the digital video summary system 102 can divide a digital video into segments that contain contiguous sequences of frames. Based on generating these video segments, the digital video summary system 102 can further analyze each segment as if it were a digital video—i.e., by utilizing the neural networks and performing the methods and techniques described above—to generate selection scores for the frames in each segment. In some embodiments, to generate a storyboard, the digital video summary system 102 can select a single frame from each segment (or from a subset of the segments)—e.g., a frame that has a top selection score among the frames within the segment.

As mentioned, FIG. 7C illustrates a process of generating an animated thumbnail. For example, the digital video summary system 102 can perform an act 712 of segmenting a digital video. Similar to the above discussion in relation to the storyboard, the digital video summary system 102 can divide a digital video into segments, where each segment contains a contiguous sequence of frames of the digital video. In particular, the digital video summary system 102 can implement a Kernel Temporal Segmentation algorithm to divide the digital video into segments.

In addition to the act 712, the digital video summary system 102 can perform an act 714 of determining selection scores. Indeed, similar to the above discussion in relation to generating a digital video summary in the form of a thumbnail, the digital video summary system 102 can utilize an aesthetics neural network and a relevancy neural network to generate selection scores for frames within the digital video as a whole. Indeed, the digital video summary system 102 can analyze the frames of the digital video to determine aesthetics scores and importance scores, and to further determine selection scores based on the aesthetics scores and importance scores. In some embodiments, the digital video summary system 102 can analyze frames of each segment independently (e.g., by utilizing the aesthetics neural network and the relevancy neural network) to generate selection scores for frames within individual segments.

Additionally, the digital video summary system 102 can perform an act 716 of selecting a frame. In particular, the digital video summary system 102 can select a frame with a highest selection score from among the frames of the digital video, similar to the above discussion of FIG. 7A. In some embodiments, on the other hand, the digital video summary system 102 can further perform the act 716 by selecting a frame for each segment (e.g., to form a plurality of flashcards or a storyboard). For example, in these embodiments the digital video summary system 102 selects a single frame per segment. Indeed, similar to the discussion above in relation to FIG. 7A, the digital video summary system 102 can select, from each segment, a frame that has the highest selection score among the frames within the segment.

As shown, the digital video summary system 102 further performs an act 718 of determining a segment corresponding to the selected frame. Indeed, in embodiments where the digital video summary system 102 selects a single frame for the digital video, the digital video summary system 102 can further determine a location (e.g., a timestamp or frame count) of the selected frame within the digital video. Based on the location of the frame, the digital video summary system 102 can determine a segment from among the divided segments of the digital video that contains the selected frame.

Furthermore, the digital video summary system 102 can perform an act 720 of generating an animated thumbnail from the segment. In particular, the digital video summary system 102 can utilize the segment that contains the selected frame and a selected segment for the animated thumbnail. Thus, the digital video summary system 102 can provide an animated thumbnail that consists of a playable version of the segment that contains the selected frame.

In some embodiments, the digital video summary system 102 can select more than one segment that are within a given number of frames or a time threshold of the selected frame. In other embodiments, the digital video summary system 102 can ignore segmenting the digital video (e.g., by not performing act 712 in the first place) and by simply slicing the digital video around the selected frame. For example, in these embodiments the digital video summary system 102 can select a particular number of frames or a particular length of video footage surrounding the selected frame (e.g., before and/or after) to provide as an animated thumbnail.

As mentioned, the digital video summary system 102 can also generate a video trailer. FIG. 7D illustrates a process of generating a video trailer. In particular, the digital video summary system 102 can perform an act 722 of segmenting a digital video. As described above, the digital video summary system 102 can utilize a Kernel Temporal Segmentation algorithm to divide a digital video into segments (e.g., a particular number of segments having uniform or non-uniform lengths).

In addition, the digital video summary system 102 can perform an act 724 of determining selection scores. In particular, the digital video summary system 102 can determine selection scores for frames within each respective segment of the digital video. For example, the digital video summary system 102 can utilize an aesthetics neural network and a relevancy neural network (as described above) in relation to each individual segment to analyze the frames therein. Based on determining the selection scores for the frames of each individual segment, the digital video summary system 102 can further perform act 726 to determine segment scores.

To illustrate, the digital video summary system 102 can determine segment scores by summing or otherwise combining selection scores within each respective segment. In some embodiments, the digital video summary system 102 determines a segment score by totaling the selection scores for every frame within a given digital video segment. In other embodiments, the digital video summary system 102 determines a segment score by totaling selection scores for a selected set of frames from a given segment. For example, the digital video summary system 102 can utilize the aesthetics neural network, relevancy neural network, and generative reconstructor neural network (as described above) with respect to each individual segment (as if each segment were its own digital video) to select frames frame from each segment. Then, based on the selection scores of the selected frames for a given segment, the digital video summary system 102 can determine a corresponding segment score.

As shown, the digital video summary system 102 further performs an act 728 of utilizing a knapsack algorithm as part of generating a video trailer. For instance, the digital video summary system 102 determines which segments from the set of all segments of a digital video to utilize as part of a video trailer. By virtue of implementing a knapsack algorithm, the digital video summary system 102 selects segments to maximize segment scores within an allotted time constraint.

To elaborate, the digital video summary system 102 can determine a maximum length (e.g., a number of frames or a length of time) of the animated thumbnail by, for example, receiving a user input indicating a maximum length or else by determining the maximum length as a percentage of the total length of the digital video (e.g., 5% or 10%). Based on the maximum length, the digital video summary system 102 can utilize a knapsack algorithm to choose which segments to use within the animated thumbnail. Indeed, the digital video summary system 102 can choose which segments to use that contain frames that will maximize the value of the segment scores (e.g., the summed selection scores of constituent frames) given the time constraint. Thus, the digital video summary system 102 may select one or more segments to use as part of the video trailer. The digital video summary system 102 can further arrange the selected segments in temporal order so that, when viewed, the frames appear in the same order in which they appear in the original digital video.

Furthermore, the digital video summary system 102 can perform an act 730 of arranging the selected frames in temporal order. In particular, similar to the discussion above in relation to FIG. 7B, the digital video summary system 102 can analyze metadata or other information associated with the frames to determine a time associated with each frame. The digital video summary system 102 can arrange the selected frames in the order in which they appear in the digital video. In this way, the digital video summary system 102 can generate a video trailer that consists of a number of relevant frames that, when played together, accurately summarize the digital video from start to finish.

In some embodiments, the digital video summary system 102 can generate an animated thumbnail or a video trailer (as illustrated in FIG. 7C and FIG. 7D, respectively) in accordance with the following pseudo-code:

Inputs: Source video $V$ containing $n$ frames

Output: Video summary Sum

Video segmentation: Slice video into $N$ segments, $N \leq n$;

return Segmentation $Seg$;

Selection: Use $ReconstSum$ to select $m$ frames ($m = 1$ if generating animated thumbnails);

return the selection vector $Sel$;

Score assignment: Assign scores to each segment $Seg_i$

For $i \leq N$, $j \leq n$:

$$Score(Seg_i) = \sum_{j}^{j+len(Seg_i)} Sel_j, j+ = len(Seg_i)$$

Summary generation: Sum = knapsack($Seg$, $L$) to maximize value(Sum), Sum $\subset Seg$ where Video is the original digital video, ReconstSum refers to the algorithms and networks implemented by the digital video summary system 102 described in relation to FIGS. 3-6, value($Seg_i$) represents a segment score for the $i^{th}$ segment, $Sel_j$ represents the selection score for the $j^{th}$ frame within the $i^{th}$ segment, "knapsack" refers to a knapsack algorithm, and L is a maximum length of a digital video summary (e.g., an animated thumbnail or video trailer). In one or more embodiments, the digital video summary system 102 performs the video segmentation technique described in Danila Potapov, Matthij s Douze, Zaid Harchaoui, and Cordelia Schmid, *Category-specific Video Summarization*, European Conference on Computer Vision, Springer 540-555 (2014), which is incorporated herein by reference in its entirety.

Figure 8:
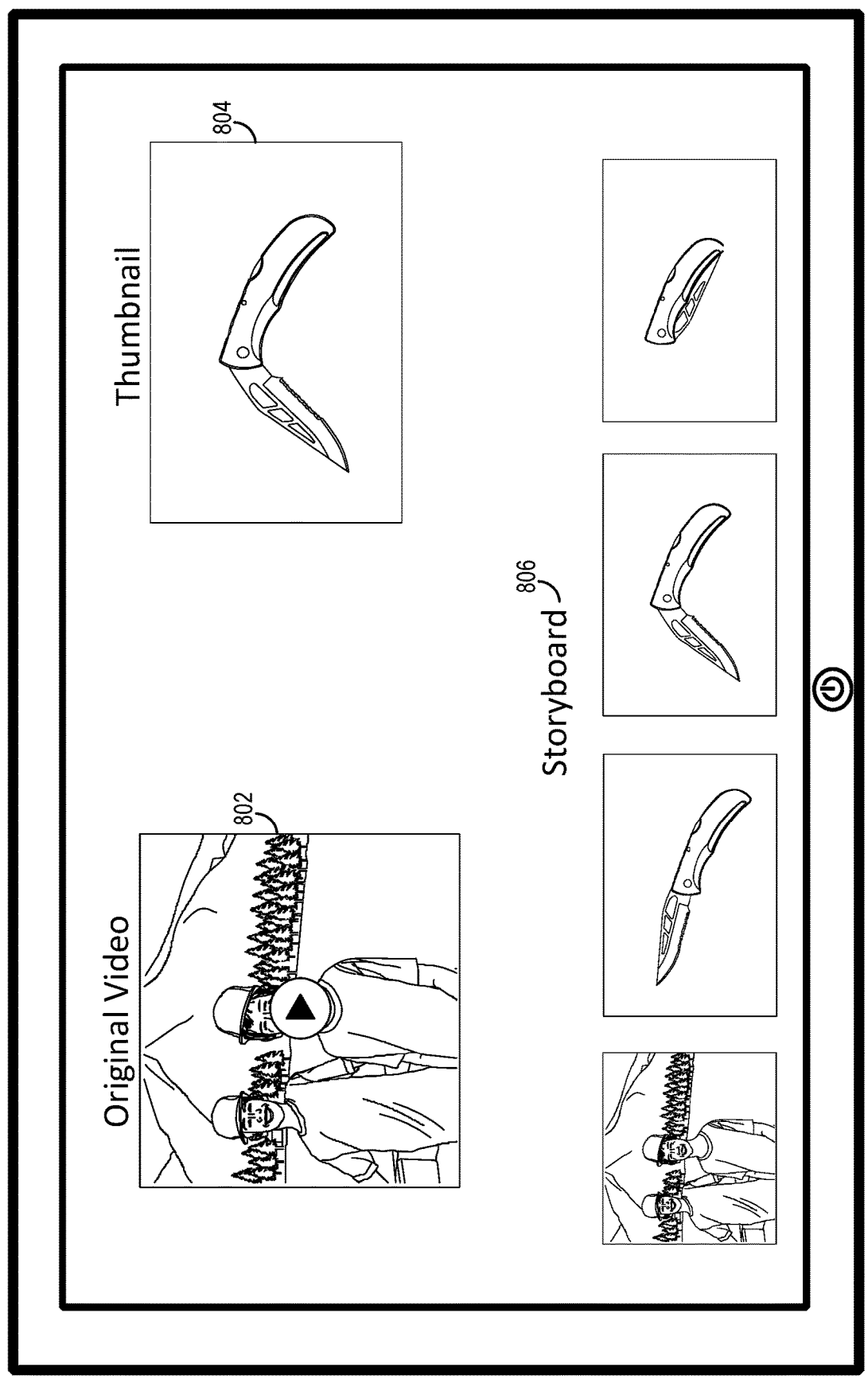
FIG. 8 illustrates digital video summaries in accordance with one or more embodiments.
Figure 9:
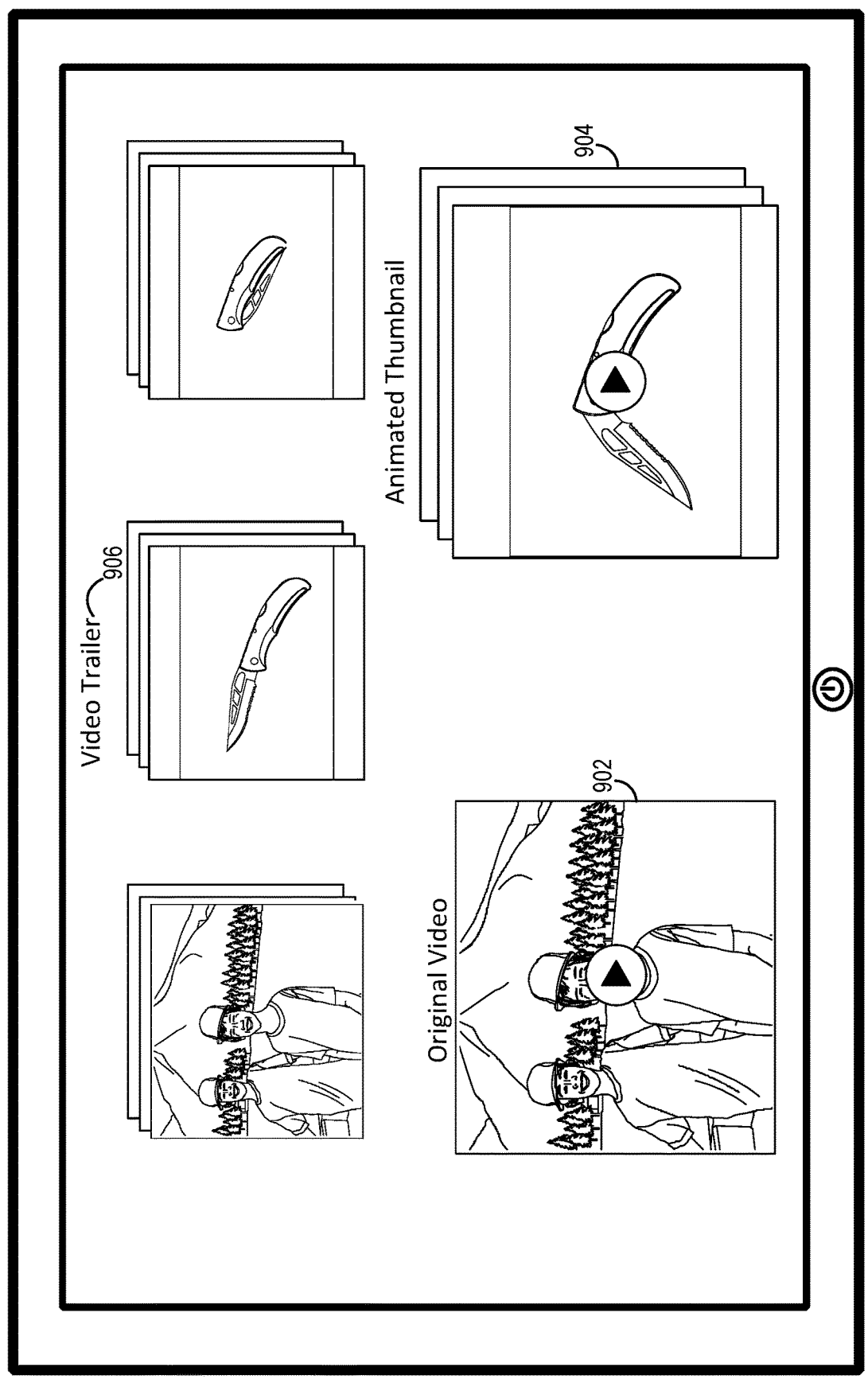
FIG. 9 illustrates digital video summaries in accordance with one or more embodiments.

As mentioned, the digital video summary system 102 generates digital video summaries in the form of thumbnails, storyboards, animated thumbnails, and/or video trailers. For example, the digital video summary system 102 can receive a user input or other indication to determine which format of digital video summary to generate. Indeed, FIGS. 8 and 9 illustrate examples of digital video summaries in the various formats. In particular, FIG. 8 illustrates an original digital video 802, a thumbnail 804, and a storyboard 806. As disclosed herein, the digital video summary system 102 can generate the thumbnail 804 based on analyzing the digital video 802 to identify a frame of the digital video 802 that has a selection score that indicates a high likelihood of being representative of the digital video 802. As shown, the digital video summary system 102 determines that the thumbnail 804 for the digital video 802 is a frame that shows a half-opened pocket knife. For instance, the digital video 802 may be an outdoor advertisement for this particular pocket knife or else the digital video 802 may otherwise focuses on the pocket knife, which results in the digital video summary system 102 selecting the illustrated frame as the thumbnail 804.

As also shown, the digital video summary system 102 can generate the storyboard 806 as a digital video summary to represent the digital video 802. The digital video summary system 102 generates the storyboard 806 by selecting a number of frames (e.g., highest-ranked frames) of the digital video 802 that satisfy a selection score threshold. As illustrated, the digital video summary system 102 selects four frames for the storyboard (although the digital video summary system 102 can select more or fewer than four frames for a storyboard depending on the embodiment). Similar to the thumbnail 804, the digital video summary system 102 selects storyboard frames that relate to a pocket knife. In addition, the digital video summary system 102 selects a frame that shows the two boys in the beginning of the digital video 802 based on the analysis described above with reference to the previous figures.

The digital video summary system 102 can utilize a default number of frames for generating the storyboard 806, or the digital video summary system 102 can receive user input to indicate a number of desired frames for the storyboard 806. In some embodiments, the digital video summary system 102 can determine a number of frames for a given storyboard by determining a total number of frames of the digital video 802 and selecting a storyboard frame per a given number of video frames (e.g., 100 frames, 1000 frames, 10000 frames, etc.). In a similar fashion, in some embodiments, the digital video summary system 102 can select storyboard frames based on the total length of the original digital video 802, where the digital video summary system 102 selects a frame for every given interval of the original video 802 (e.g., 10 seconds, 30 seconds, 1 minute, etc.).

As mentioned, the digital video summary system 102 can generate animated digital video summaries as well. Indeed, FIG. 9 illustrates an original digital video 902, an animated thumbnail 904, and a video trailer 906. As disclosed herein, the digital video summary system 102 generates the animated thumbnail 904 by analyzing the digital video 902 in accordance with the disclosure herein to, for example, select a segment that contains a highest-ranked frame (e.g., a frame with a top selection score) as a digital video summary.

In some embodiments, the digital video summary system 102 need not divide the digital video 902 into segments to generate the animated thumbnail 904. Instead, as described above, the digital video summary system 102 can select a plurality of frames from the digital video 902 as a whole and can order the frames sequentially. Thus, when viewed by a user, the frames of the animated thumbnail 904 appear in the same order as they appear in the digital video 902 and thereby summarize the digital video 902.

As illustrated, the digital video summary system 102 can further generate a video trailer 906. For instance, the digital video summary system 102 can generate the video trailer 906 by segmenting the digital video 902 and selecting frames (or segments) which maximize the resulting selection scores, as described above. As shown, the digital video summary system 102 selects three different segments: a first segment (e.g., a first set of frames) showing the two boys, a second segment (e.g., a second set of frames) showing the knife in an open position, and a third segment (e.g., a third set of frames) showing the knife in a closed position.

Figure 10:
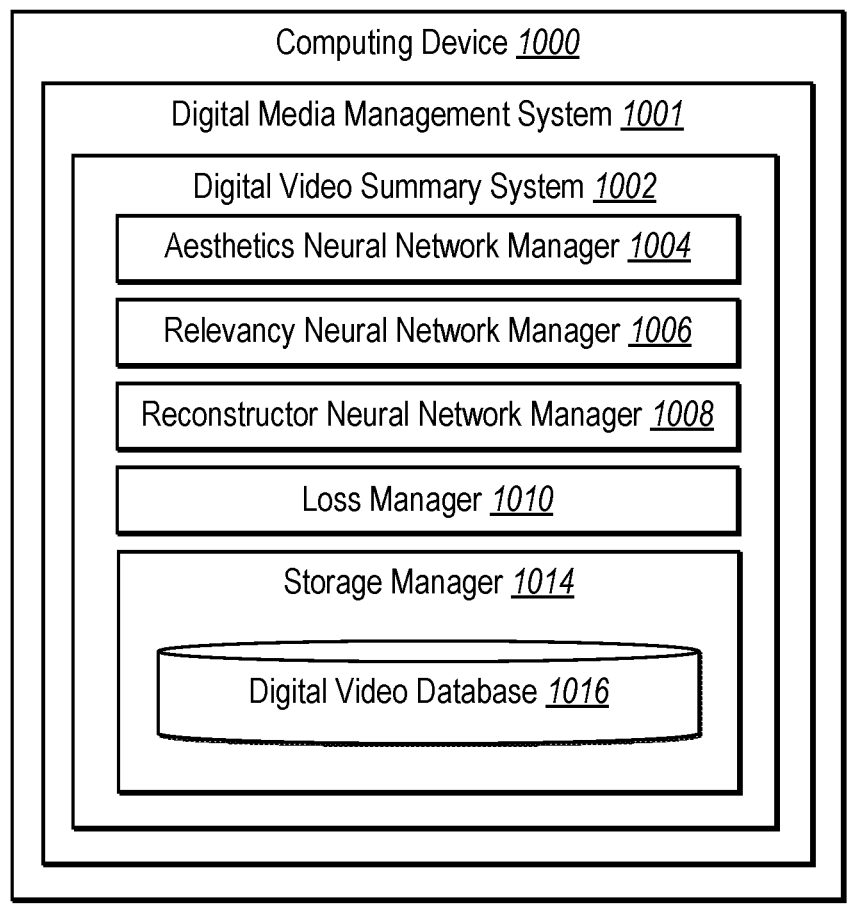
FIG. 10 illustrates a schematic diagram of a digital video summary system in accordance with one or more embodiments.

Looking now to FIG. 10, additional detail will be provided regarding components and capabilities of the digital video summary system 1002 (e.g., the digital video summary system 102). Specifically, FIG. 10 illustrates an example schematic diagram of the digital video summary system 1002 on an example computing device 1000 (e.g., one or more of the client device 108 and/or server(s) 104). As shown in FIG. 10, the digital video summary system 1002 may include an aesthetics neural network manager 1004, a relevancy neural network manager 1006, a reconstructor neural network manager 1008, a loss manager 1010, and a storage manager 1014.

As mentioned, the digital video summary system 1002 can include an aesthetics neural network manager 1004. In particular, the aesthetics neural network manager 1004 can manage, train, utilize, implement, or apply an aesthetics neural network to a digital video. To illustrate, the aesthetics neural network manager 1004 can train an aesthetics neural network to analyze a digital video to determine aesthetics scores for frames of the digital video in accordance with the disclosure herein.

In addition, the digital video summary system 1002 can include a relevancy neural network manager 1006. In some embodiments, the relevancy neural network manager 1006 can manage, train, utilize, implement, or apply a convolutional neural network to a digital video. In particular, the relevancy neural network manager 1006 can train a convolutional neural network to generate sets of deep features for frames of a digital video. Based on the sets of deep features, the relevancy neural network manager 1006 can further utilize a relevancy neural network to determine importance scores for frames of the digital video in accordance with the disclosure herein.

The relevancy neural network manager 1006 can further communicate with the aesthetics neural network manager 1004 to receive information pertaining to aesthetics scores for frames of a digital video. Accordingly, the relevancy neural network manager 1006 can generate, identify, or determine selection scores for frames of the digital video based on aesthetics scores and importance scores in accordance with the disclosure herein.

The digital video summary system 1002 can further include reconstructor neural network manager 1008. In particular, the reconstructor neural network manager 1008 can manage, train, utilize, implement, or apply a generative reconstructor neural network to generate a digital video reconstruction. For example, the reconstructor neural network manager 1008 can utilize an LSTM encoder and an LSTM decoder to generate a digital video reconstruction based on the selection scores of the frames of the digital video. As described herein, the reconstructor neural network manager 1008 can further manage a generative reconstructor neural network having a different architecture. For example, the reconstructor neural network manager 1008 can manage a VAE, GAN, or a combination thereof to generate a digital video reconstruction.

As further illustrated in FIG. 10, the digital video summary system 1002 can include a loss manager 1010. In particular, the loss manager 1010 can determine, evaluate, identify, or generate a measure of loss or an error. The loss manager 1010 can determine a variety of different losses. For example, the loss manager 1010 can determine a reconstruction loss between a digital video reconstruction and an original digital video. The loss manager 1010 can compare a digital video reconstruction with an original digital video to test the accuracy of the digital video summary system 1002 and to improve the accuracy as well.

The loss manager 1010 can also utilize, apply, or implement a loss to minimize the difference between digital video reconstructions and the original digital video. For instance, based on a measure of loss, the loss manager 1010 can further communicate with one or more of the aesthetics neural network manager 1004, the relevancy neural network manager 1006, or the reconstructor neural network manager 1008 to modify relevant parameters of the various neural networks associated with each component.

In addition to a reconstruction loss, the digital video summary system 1002 can also determine and utilize a sparsity loss (i.e., a loss applied to a selector to reduce the number of selected frames), a repelling sparsity loss (i.e., a loss applied to a selector to increase space or distance between selected frames), a VAE loss (e.g., a prior loss utilized in training a variable autoencoder), a generative loss (e.g., a loss reflecting error of a generator in a generative adversarial neural network utilized to train the generator), and a discriminator loss (e.g., a loss reflecting error of a discriminator in a generative adversarial neural network utilized to train the discriminator).

As mentioned, the digital video summary system 1002 further includes a storage manager 1014. In particular the storage manager 1014 can communicate with one or more of the aesthetics neural network manager 1004, the relevancy neural network manager 1006, or the reconstructor neural network manager 1008 to provide, store, manage, or maintain a digital video database 1016. For example, the digital video database 1016 can include digital videos, neural networks (e.g., architecture and/or network weighting parameters), sets of deep features for frames of a digital video, and digital video reconstructions that the various components of the digital video summary system 1002 can access or store as described herein.

As illustrated, the digital video summary system 1002 and its constituent components can be included in a digital media management system 1001 (e.g., the digital media management system 106). In particular, the digital media management system 1001 can include a digital video editing system, a digital content campaign system, or a digital media distribution system.

In one or more embodiments, each of the components of the digital video summary system 1002 are in communication with one another using any suitable communication technologies. Additionally, the components of the digital video summary system 1002 can be in communication with one or more other devices including one or more user client devices described above. It will be recognized that although the components of the digital video summary system 1002 are shown to be separate in FIG. 10, any of the subcomponents may be combined into fewer components, such as into a single component, or divided into more components as may serve a particular implementation. Furthermore, although the components of FIG. 10 are described in connection with the digital video summary system 1002, at least some of the components for performing operations in conjunction with the digital video summary system 1002 described herein may be implemented on other devices within the environment.

The components of the digital video summary system 1002 can include software, hardware, or both. For example, the components of the digital video summary system 1002 can include one or more instructions stored on a computer-readable storage medium and executable by processors of one or more computing devices (e.g., the computing device 1000 or the computing device 1300 of FIG. 13). When executed by the one or more processors, the computer-executable instructions of the digital video summary system 1002 can cause the computing device 1000 to perform the methods described herein. Alternatively, the components of the digital video summary system 1002 can comprise hardware, such as a special purpose processing device to perform a certain function or group of functions. Additionally or alternatively, the components of the digital video summary system 1002 can include a combination of computer-executable instructions and hardware.

Furthermore, the components of the digital video summary system 1002 performing the functions described herein may, for example, be implemented as part of a stand-alone application, as a module of an application, as a plug-in for applications including content management applications, as a library function or functions that may be called by other applications, and/or as a cloud-computing model. Thus, the components of the digital video summary system 1002 may be implemented as part of a stand-alone application on a personal computing device or a mobile device. Alternatively or additionally, the components of the digital video summary system 1002 may be implemented in any application that allows creation and delivery of marketing content to users, including, but not limited to, applications in ADOBE CREATIVE CLOUD and/or ADOBE MARKETING CLOUD, such as ADOBE CAMPAIGN, ADOBE ANALYTICS, and ADOBE MEDIA OPTIMIZER. "ADOBE," "CREATIVE CLOUD," "MARKETING CLOUD," "CAMPAIGN," "ANALYTICS," and "MEDIA OPTIMIZER," are registered trademarks of Adobe Systems Incorporated in the United States and/or other countries.

FIGS. 1-10, the corresponding text, and the examples provide a number of different systems, methods, and non-transitory computer readable media for generating and providing digital video summaries. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
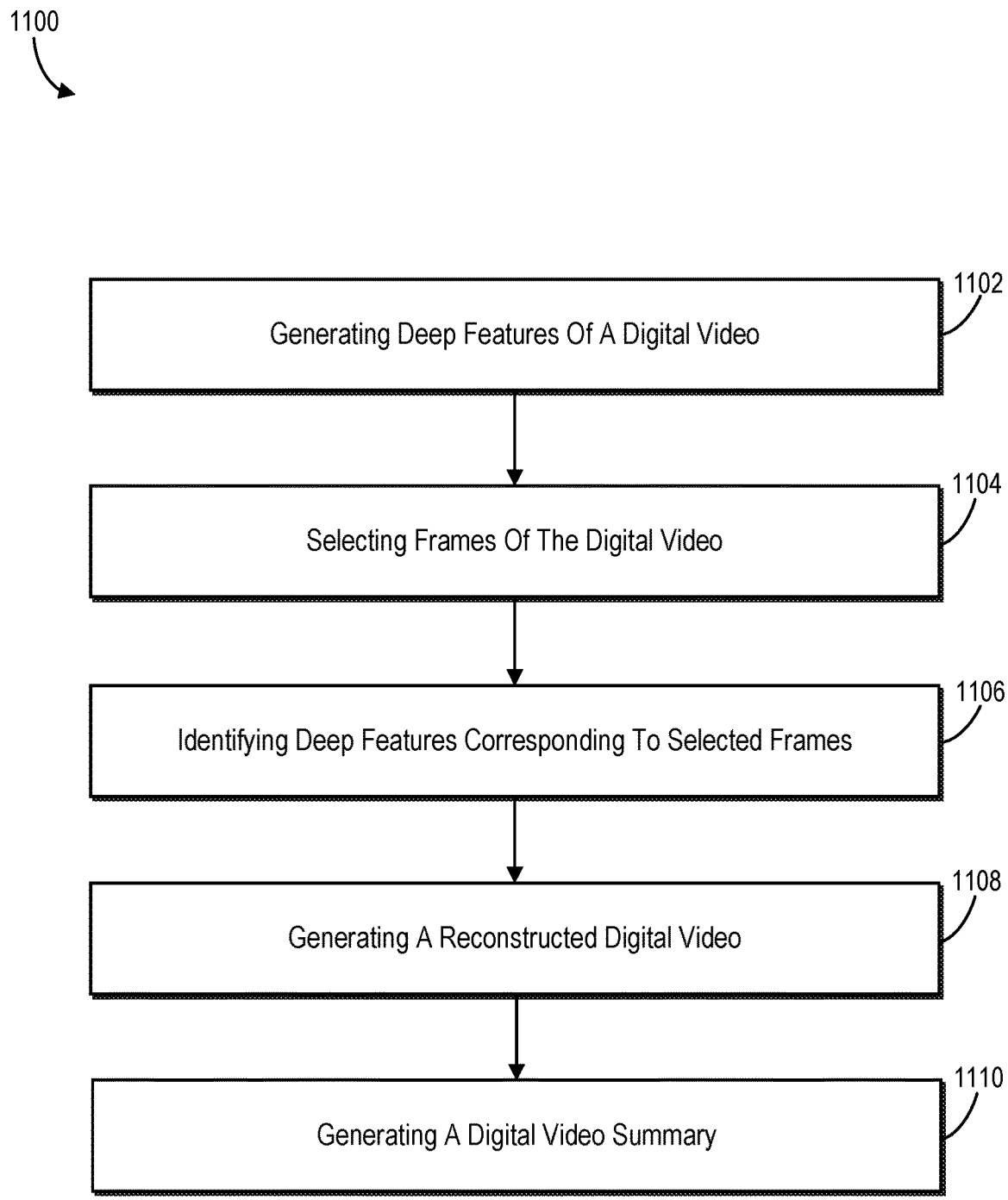
FIG. 11 illustrates a flowchart of a series of acts for generating digital video summaries in accordance with one or more embodiments.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 of generating and providing a digital video summary for a digital video. In some embodiments, the digital video summary system 102 can perform the series of acts 1100 by utilizing a digital video summary model that includes an aesthetics neural network, a relevancy neural network, and a generative reconstructor neural network. In particular, the series of acts 1100 can include an act 1102 of generating deep features of a digital video. For example, act 1102 can involve applying a convolutional neural network to a plurality of frames of a digital video to generate a set of deep features for the plurality of frames.

The series of acts 1100 can further include an act 1104 of selecting frames of the digital video. In particular, the act 1104 can involve utilizing a relevancy neural network and an aesthetics neural network to select one or more frames of the digital video based on the set of deep features. The aesthetics neural network can be a convolutional neural network trained based on a plurality of training digital frames and corresponding ground-truth aesthetics scores. In addition, the act 1104 can involve analyzing the plurality of frames utilizing the aesthetics neural network to generate aesthetics scores, analyzing the deep features for the plurality of frames utilizing the relevancy neural network to generate relevancy scores, determining selection scores by combining the aesthetics scores and relevancy scores, and selecting the one or more frames based on the selection scores.

As shown, the series of acts 1100 can further include an act 1106 of identifying deep features corresponding to selected frames. In particular, the act 1106 can involve identifying, from the set of deep features, a subset of deep features corresponding to the one or more selected frames of the digital video.

The series of acts 1100 can further include an act 1108 of generating a digital video reconstruction. In particular, the act 1108 can involve applying a generative reconstructor neural network to the subset of deep features corresponding to the one or more selected frames of the digital video to generate a digital video reconstruction. The generative reconstructor neural network can include at least one of the following: a variational autoencoder, a generative adversarial network, or a combined long short-term memory encoder and long short-term memory decoder.

Additionally, the series of acts 110 can include an act 1110 of generating a digital video summary. In particular, the series of acts 1110 can involve generating a digital video summary from the one or more selected frames of the digital video based on a comparison of the digital video reconstruction and the digital video. For example, the act 1110 can include generating the digital video summary as a thumbnail by selecting a single frame of the digital video with a highest selection score. In addition, the act 1110 can include acts of: dividing the digital video into a plurality of segments, utilizing the relevancy neural network, the aesthetics neural network, and the generative reconstructor neural network to determine selection scores for frames within each respective segment of the digital video, and utilizing a knapsack algorithm to generate an animated digital video summary by selecting a set of segments based on the determined selection scores. The relevancy neural network can include a bidirectional long short-term memory network trained based on a plurality of training digital videos having a plurality of training digital frames and ground-truth relevancy scores of each frame of the plurality of training frames of the plurality of training digital videos. In some embodiments, the act 1110 can include generating a plurality of digital video summary formats comprising at least two of: a thumbnail format, a storyboard format, an animated thumbnail format, and a video trailer format.

Although not illustrated in FIG. 11, the series of acts 1100 can include an act of determining a measure of loss between the digital video reconstruction and the digital video. In addition, the series of acts can include an act of determining that the measure of loss between the digital video reconstruction and the digital video satisfies a threshold loss and an act of selecting the one or more frames based on determining that the measure of loss between the digital video reconstruction and the digital video satisfies the threshold loss.

Furthermore, the series of acts 1100 can include acts of identifying a summary length, identifying a plurality of digital video segments of the digital video corresponding to the plurality of frames, and applying a knapsack algorithm to the plurality of segments to select a subset of the segments that collectively satisfy the summary length. The series of acts 1100 can further include acts of arranging the plurality of segments in a temporal order based on the digital video, and generating the digital video summary in the video trailer format utilizing the plurality of segments arranged in the temporal order.

Figure 12:
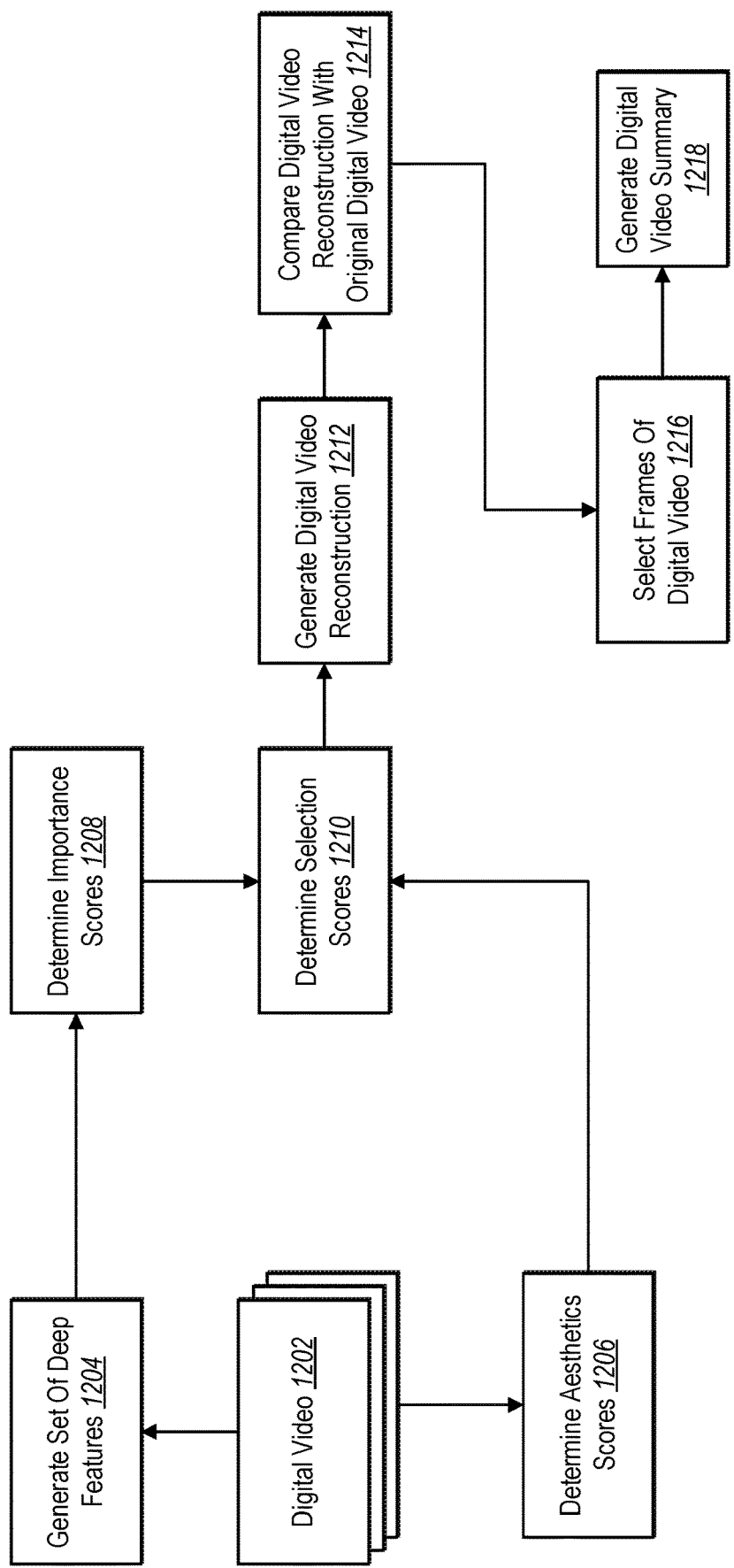
FIG. 12 illustrates a series of acts in a step for selecting one or more frames from a plurality of frames based on a digital video reconstruction created using a generative reconstructor neural network, an aesthetics neural network, and relevancy neural network in accordance with one or more embodiments.

As mentioned, the digital video summary system 102 generates a digital video summary based on analyzing frames of a digital video. Indeed, FIG. 12 illustrates exemplary acts in a step for selecting one or more frames from the plurality of frames based on a digital video reconstruction created using a generative reconstructor neural network, an aesthetics neural network, and relevancy neural network.

As illustrated, the step for selecting one or more frames from the plurality of frames based on a digital video reconstruction created using a generative reconstructor neural network, an aesthetics neural network, and relevancy neural network representation can include acts 1204-1216. In particular, the digital video summary system 102 can perform act 1204 to generate a set of deep features for one or more of the frames of the digital video 1202. As disclosed herein, the digital video summary system 102 can utilize a convolutional neural network to analyze the frames of the digital video 1202 to generate a sequence of deep features for each frame.

In addition, the digital video summary system 102 can perform act 1206 to determine aesthetics scores for the frames of the digital video 1202. In particular, the digital video summary system 102 can utilize an aesthetics neural network to determine aesthetics scores in accordance with the disclosure above.

As shown, the digital video summary system 102 can further perform act 1208 to determine importance scores for the frames of the digital video 1202. In particular, the digital video summary system 102 can utilize a relevancy neural network to determine importance scores based on the respective sets of deep features associated with each of the frames of the digital video 1202.

Additionally, the digital video summary system 102 can perform act 1210 to determine selection scores for the frames of the digital video 1202. In particular, the digital video summary system 102 can determine linear combinations of importance scores and aesthetics scores for the frames of the digital video 1202 in accordance with the disclosure herein.

As shown, the digital video summary system 102 can perform act 1212 to generate a digital video reconstruction. In particular, the digital video summary system 102 can generate a digital video reconstruction based on selection scores of frames of the digital video 1202 and by utilizing a generative reconstructor neural network, as described above.

Additionally, the digital video summary system 102 can perform act 1214 to compare the digital video reconstruction with the digital video 1202. Indeed, in accordance with this disclosure, the digital video summary system 102 can utilize one or more loss functions to determine a difference between the digital video reconstruction and the digital video 1202. The digital video summary system 102 can further modify parameters of one or more of the aesthetics neural network, relevancy neural network, and generative reconstructor neural network based on the comparison and to minimize the determined loss.

Furthermore, the digital video summary system 102 can perform act 1216 to select frames of the digital video 102. In particular, the digital video summary system 102 can select one or more frames of the digital video 102 based on the determined selection scores and further based on the comparison between the digital video reconstruction and the digital video 1202. As described, the digital video summary system 102 can select a frame with the highest selection score. Alternatively, the digital video summary system 102 can select a number of frames with selection scores that satisfy a threshold.

Still further, the digital video summary system 102 can perform act 1218 to generate a digital video summary. In particular, the digital video summary system 102 can generate a digital video summary using the selected frames (or selected segments containing selected frames, as described). Indeed, the digital video summary system 102 can generate a thumbnail from a single selected frame from the digital video 1202. The digital video summary system 102 can additionally or alternatively generate a storyboard, an animated thumbnail, or a video trailer from a series of selected frames in accordance with the disclosure herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
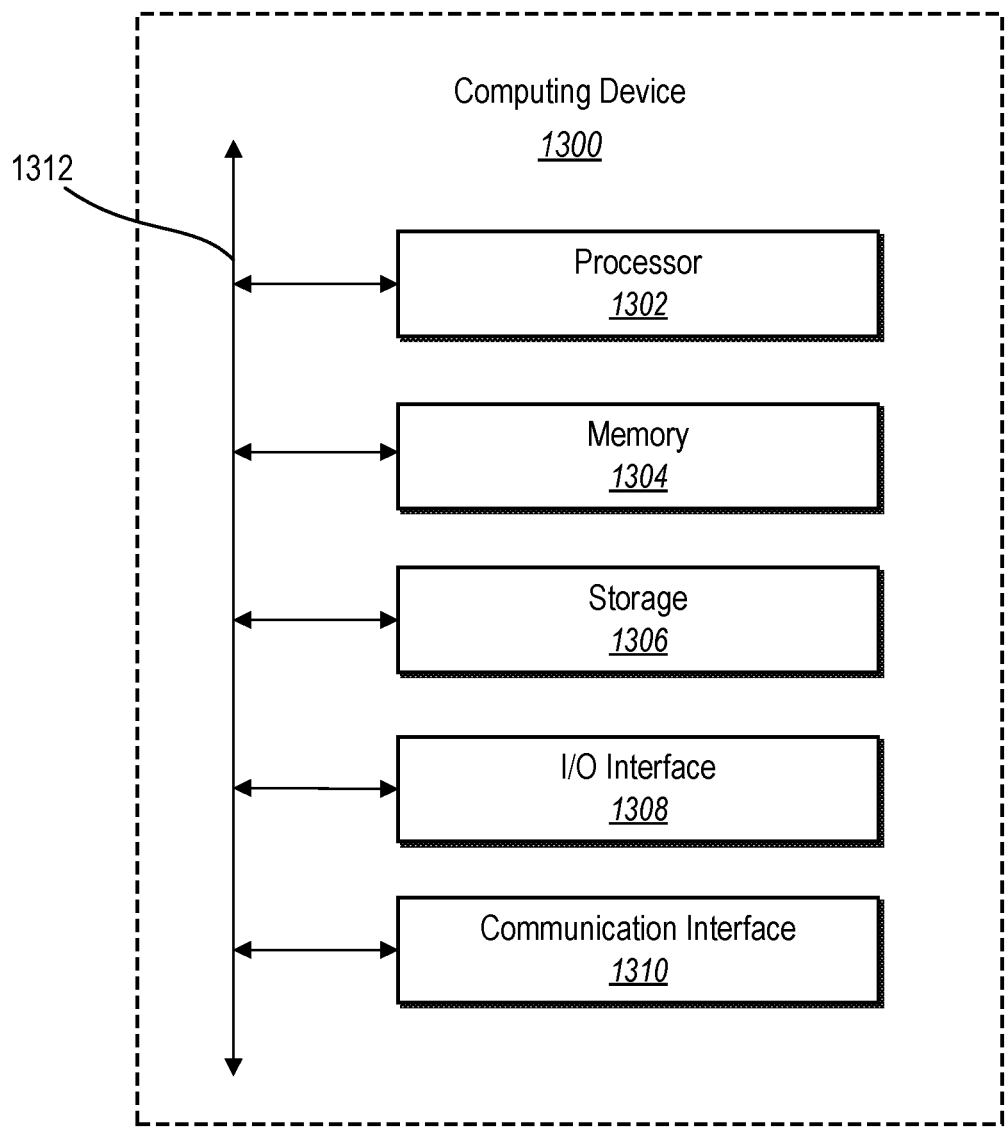
FIG. 13 illustrates a block diagram of an example computing device in accordance with one or more embodiments.

FIG. 13 illustrates, in block diagram form, an example computing device 1300 (e.g., computing device 1000, client device 108, and/or server(s) 104) that may be configured to perform one or more of the processes described above. One will appreciate that the digital video summary system 102 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for providing and editing digital media, a computer-implemented method for generating digital summaries of digital videos, the computer-implemented method comprising:
   identifying a digital video comprising a plurality of frames;
   applying a first convolutional neural network to the plurality of frames to generate a set of deep features for the plurality of frames;
   utilizing a relevancy neural network comprising a second convolutional neural network and a long short-term memory network to select one or more frames of the digital video based on the set of deep features;
   applying a generative reconstructor neural network comprising a long short-term memory encoder and a long short-term memory decoder to a subset of deep features corresponding to the selected one or more frames to generate a digital video reconstruction;
   comparing the digital video reconstruction to the digital video;
   generating, based on comparing the digital video reconstruction to the digital video, a digital video summary from the selected one or more frames of the digital video; and
   providing the digital video summary to a client device.

2. The computer-implemented method of claim 1, further comprising:
  receiving an indication of a digital video summary format from a set of compatible digital video summary formats, the set of compatible digital video summary formats comprising at least two of: a thumbnail format, a storyboard format, an animated thumbnail format, and a video trailer format; and
  based on the indication of the digital video summary format from the set of compatible digital video summary formats, generating the digital video summary from the selected one or more frames in the digital video summary format.

3. The computer-implemented method of claim 1, wherein selecting the one or more frames of the digital video comprises:
  utilizing the relevancy neural network to generate importance scores for the plurality of frames;
  applying an aesthetics neural network in parallel with the relevancy neural network to determine aesthetics scores for the plurality of frames; and
  selecting the one or more frames based on the importance scores and the aesthetics scores.

4. The computer-implemented method of claim 1, wherein the selected one or more frames comprise multiple frames; and
  further comprising generating the digital video summary in a digital video summary format comprising at least one of: a thumbnail format, a storyboard format, an animated thumbnail format, or a video trailer format by:
    identifying a summary length;
    identifying a plurality of digital video segments comprising respective subsets of frames of the digital video; and
    applying a knapsack algorithm to the plurality of digital video segments to select a subset of the digital video segments that collectively satisfy the summary length.

5. The method of claim 4, wherein the digital video summary format comprises a video trailer format and further comprising:
  arranging the plurality of digital video segments in a temporal order based on the digital video; and
  generating the digital video summary in the video trailer format utilizing the plurality of digital video segments arranged in the temporal order.

6. A non-transitory computer readable medium for generating digital summaries of digital videos, the non-transitory computer readable medium comprising instructions that, when executed by at least one processor, cause a computer device to:
  apply a first convolutional neural network to a plurality of frames of a digital video to generate a set of deep features for the plurality of frames;
  utilize a relevancy neural network comprising a second convolutional neural network and a long short-term memory network to select one or more frames of the digital video based on the set of deep features;
  apply a generative reconstructor neural network comprising a long short-term memory encoder and a long short-term memory decoder to a subset of deep features corresponding to the one or more selected frames of the digital video to generate a digital video reconstruction;
  compare the digital video reconstruction to the digital video utilizing a loss function; and
  generate a digital video summary from the one or more selected frames of the digital video based on the comparison of the digital video reconstruction to the digital video.

7. The non-transitory computer readable medium of claim 6, further comprising instructions that, when executed by the at least one processor, cause the computer device to select the one or more frames of the digital video by:
  analyzing the plurality of frames utilizing an aesthetics neural network to generate aesthetics scores;
  analyzing the set of deep features for the plurality of frames utilizing the relevancy neural network in parallel with the aesthetics neural network to generate importance scores;
  determining selection scores for the plurality of frames by combining the aesthetics scores and the importance scores; and
  selecting the one or more frames based on the selection scores.

8. The non-transitory computer readable medium of claim 7, further comprising instructions that, when executed by the at least one processor, cause the computer device to generate the digital video summary as a thumbnail by selecting a single frame of the digital video with a highest selection score.

9. The non-transitory computer readable medium of claim 7, further comprising instructions that, when executed by the at least one processor, cause the computer device to generate the digital video summary by:
  dividing the digital video into a plurality of segments comprising respective time intervals of the digital video;
  utilizing the relevancy neural network, the aesthetics neural network, and the generative reconstructor neural network to determine selection scores for frames within each respective segment of the digital video; and
  utilizing a knapsack algorithm to generate an animated digital video summary by selecting a set of segments based on the determined selection scores.

10. The non-transitory computer readable medium of claim 6, further comprising instructions that, when executed by the at least one processor, cause the computer device to compare the digital video reconstruction to the digital video by utilizing the loss function to determine a measure of loss between the digital video reconstruction and the digital video.

11. The non-transitory computer readable medium of claim 10, further comprising instructions that, when executed by the at least one processor, cause the computer device to generate the digital video summary by:
  determining that the measure of loss between the digital video reconstruction and the digital video satisfies a threshold loss; and
  selecting the one or more frames based on determining that the measure of loss between the digital video reconstruction and the digital video satisfies the threshold loss.

12. The non-transitory computer readable medium of claim 11, further comprising instructions that, when executed by the at least one processor, cause the computer device to:
  utilize the relevancy neural network to select an initial set of frames of the digital video;
  apply the generative reconstructor neural network to the initial set of frames of the digital video to generate an initial digital video reconstruction;

determine an initial measure of loss between the initial digital video reconstruction and the digital video; and based on the initial measure of loss not satisfying a threshold loss value, utilize the relevancy neural network to select the one or more frames.

13. The non-transitory computer readable medium of claim 7, wherein the aesthetics neural network comprises a convolutional neural network trained based on a plurality of training digital frames and corresponding ground-truth aesthetics scores.

14. The non-transitory computer readable medium of claim 6, wherein the relevancy neural network comprises a bidirectional long short-term memory network trained based on a plurality of training digital videos having a plurality of training digital frames and ground-truth importance scores of each frame of the plurality of training frames of the plurality of training digital videos.

15. The non-transitory computer readable medium of claim 6, wherein the generative reconstructor neural network comprises at least one of the following: a variational autoencoder, a generative adversarial network, or a combined long short-term memory encoder and long short-term memory decoder.

16. A system comprising:
   at least one processor; and
   a memory comprising a digital video summary model, wherein the digital video summary model comprises:
      a relevancy neural network comprising a convolutional neural network and a long short-term memory network; and
      a generative reconstructor neural network comprising a long short-term memory encoder and a long short-term memory decoder; and
      the digital video summary model is operable to generate a plurality of digital video summary formats comprising at least two of: a thumbnail format, a storyboard format, an animated thumbnail format, and a video trailer format; and
   instructions that, when executed by the at least one processor, cause the system to:
      identify an indication of a digital video summary format of the plurality of video summary formats to generate for a digital video;
      utilize the relevancy neural network to select one or more frames of the digital video;
      apply the generative reconstructor neural network to the selected one or more frames of the digital video to generate a digital video reconstruction;
      compare the digital video reconstruction to the digital video utilizing a loss function; and
      generate, from the selected one or more frames, a digital video summary in the identified digital video summary format based on the comparison of the digital video reconstruction to the digital video.

17. The system of claim 16, further comprising instructions that, when executed by the at least one processor, cause the system to select the one or more frames of the digital video by:
   analyzing a plurality of frames utilizing an aesthetics neural network to generate aesthetics scores;
   analyzing deep features for the plurality of frames utilizing the relevancy neural network to generate importance scores;
   determining selection scores for the plurality of frames by combining the aesthetics scores and the importance scores; and
   selecting the one or more frames based on the selection scores.

18. The system of claim 17, further comprising instructions that, when executed by the at least one processor, cause the system to generate the digital video summary as a thumbnail by selecting a single frame of the digital video with a highest selection score.

19. The system of claim 17, further comprising instructions that, when executed by the at least one processor, cause the system to generate the digital video summary by:
   dividing the digital video into a plurality of segments comprising respective time intervals of the digital video;
   utilizing the relevancy neural network and the generative reconstructor neural network to determine selection scores for frames within each respective segment of the digital video; and
   utilizing a knapsack algorithm to generate an animated digital video summary by selecting a set of segments based on the determined selection scores.

20. The system of claim 16, further comprising instructions that, when executed by the at least one processor, cause the system to compare the digital video reconstruction to the digital video by utilizing the loss function to determine a measure of loss between the digital video reconstruction and the digital video.

* * * * *